United States Patent [19]

Tsukamoto

[11] Patent Number: 5,696,558
[45] Date of Patent: Dec. 9, 1997

[54] CODING APPARATUS

[75] Inventor: Manabu Tsukamoto, Nagaokakyo, Japan

[73] Assignee: Mitsubishi Denki Kabushiki Kaisha, Tokyo, Japan

[21] Appl. No.: 651,932

[22] Filed: May 21, 1996

Related U.S. Application Data

[62] Division of Ser. No. 407,255, Mar. 20, 1995, abandoned, which is a continuation of Ser. No. 116,554, Sep. 7, 1993, abandoned, which is a continuation of Ser. No. 756,056, Sep. 6, 1991, abandoned.

[30] Foreign Application Priority Data

| Sep. 10, 1990 | [JP] | Japan | 2-240953 |
| Mar. 13, 1991 | [JP] | Japan | 3-48272 |
| Jun. 7, 1991 | [JP] | Japan | 3-136104 |

[51] Int. Cl.$^6$ .............. H04N 7/12; H04N 11/02; H04N 11/04

[52] U.S. Cl. .............. 348/405; 386/109; 386/112; 386/124

[58] Field of Search .............. 348/419, 384, 348/390, 397, 398, 403–405, 420, 411; 386/33, 109, 111–112; 360/8; 382/232, 236, 238, 244–246, 251; H04N 7/130, 7/137, 7/12, 11/04, 11/02

[56] References Cited

U.S. PATENT DOCUMENTS

| 4,386,366 | 5/1983 | Mori . | |
| 4,920,426 | 4/1990 | Hatori et al. . | |
| 4,922,273 | 5/1990 | Yonekawa et al. . | |
| 4,939,583 | 7/1990 | Tsuboi et al. | 358/261.1 |
| 4,982,284 | 1/1991 | Koga | 358/133 |
| 4,984,076 | 1/1991 | Watanabe et al. . | |
| 5,014,198 | 5/1991 | Umemura . | |
| 5,025,482 | 6/1991 | Murakami et al. . | |
| 5,054,103 | 10/1991 | Yasuda et al. | 382/56 |
| 5,073,820 | 12/1991 | Nakagawa et al. . | |
| 5,073,821 | 12/1991 | Juri | 358/133 |
| 5,121,705 | 6/1992 | Ng et al. . | |
| 5,146,324 | 9/1992 | Miller et al. . | |
| 5,524,071 | 6/1996 | Yokomizo | 382/284 |

FOREIGN PATENT DOCUMENTS

| 267579 | 11/1987 | European Pat. Off. . |
| 323362 | 12/1988 | European Pat. Off. . |
| 380081 | 1/1990 | European Pat. Off. . |
| 385654 | 2/1990 | European Pat. Off. . |
| 401854 | 6/1990 | European Pat. Off. . |
| 60-54581 | 3/1985 | Japan . |

OTHER PUBLICATIONS

S. Borgers et al.; "An experimental Digital VCR With 40 MM Drum, Single Actuator, and DCT Based Bit-Rate Reduction", IEEE Transactions on Consumer Electronics, Aug. 1988.

"On Adaptive DCT Techniques for Digital Video Recording"; IEEE Proc. 7th Int. Conference on Video, Audio and Data Recording; Mar. 1988.

Primary Examiner—Howard W. Britton
Assistant Examiner—Vincent F. Boccio

[57] ABSTRACT

A coding apparatus for reduction and variable-length-coding of digital image data, wherein the image data is once variable-length-coded to obtain a variable length coded data. The variable length coded data is coded again to produce an amount of data. The amount of data is used to select an optimum quantization level. The variable length coded data is then coded again with the optimum quantization level to maximize a recording density of the twice coded data on a recording medium.

9 Claims, 19 Drawing Sheets

Fig. 8

| RATE OF BIT NUMBER | QUANTIZING LEVEL |
|---|---|
| ~70% | 10.75 BIT |
| 70%~80% | 10.5 BIT |
| 80%~90% | 10.25 BIT |
| 90%~100% | 10 BIT |
| 100%~110% | 9.75 BIT |
| 110%~120% | 9.5 BIT |
| 120%~ | 9.25 BIT |

CODING APPARATUS

This application is a divisional of 08/407,255, filed Mar. 20, 1995, now abandoned, which is a continuation of 08/116,554, filed Sep. 7, 1993, now abandoned, which is a continuation of 07/756,056 filed Sep. 6, 1991, now abandoned.

BACKGROUND OF THE INVENTION

1. Field of the Invention

This invention relates to a coding apparatus for use in a recording apparatus such as a digital video cassette recorder or the like to record digital image data, adapted to reduce the amount of the digital image data for that purpose.

2. Description of Related Art

When the digital image data obtained by converting the analog image data to digital signals is to be recorded as it is on a recording medium like a tape, etc., generally, the enormous amount of the data exceeds the limit of the recording medium and therefore, the image data should be compressed or reduced. As such, an efficient coding apparatus has conventionally been used to reduce the image data.

FIG. 1 is a block diagram showing the structure of a conventional coding apparatus disclosed, for example, in IEEE Transactions on Consumer Electronics, Vol. 34, No. 3 (August 1988) under the title of "AN EXPERIMENTS DIGITAL VCR WITH 40 MM DRUM, SINGLE ACTUATOR AND DCT-BASED BIT-RATE REDUCTION". Referring to this FIG. 7, a formatting circuit 121 divides an inputted digital video signal into a plurality of blocks and outputs the video signal of each block to a DCT circuit 122. The DCT circuit 122 processes each block outputted from the formatting circuit 121 by DCT (Discrete Cosing Transform), and outputs the obtained coefficients to a weighting circuit 123. Each coefficient from the DCT circuit 122 is performed weighting at the weighting circuit 123 and then outputted to an adaptive quantizing circuit 124. The adaptive quantizing circuit 124 holding a plurality of quantization tables of different quantizing step widths quantizes the coefficients after weighting according to the optimum quantizing step width and outputs them to the variable length coding circuit 125. The variable length coding apparatus 125 performs variable length coding on the quantized coefficients and outputs the variable-length-coded data to a buffer memory 126. The buffer memory 126 converts the data to a fixed Pate and stores the same. The variable-length-coded data is outputted with a fixed output rate. A buffer controller 127 switches the quantizing step width at the adaptive quantizing circuit 124 so that the buffer memory 126 does not overflow, and at the same time it selects the coefficients to be coded at the variable length coding circuit 125.

The operation of the above-described apparatus will now be discussed more in detail. An inputted digital video signal is composed of, e.g., a luminance signal and two color difference signals. These signals are time-divided at the formatting circuit 121 and divided into blocks, for example, 8 picture elements×8 lines and outputted to the DCT circuit 122. The video signal in each block is processed by DCT on 8 picture elements in the horizontal and in the vertical directions at the DCT circuit 122. Supposing that the video signal is expressed by x(i,j) (i,j=0, 1, . . . , 7), DCT on 8 picture elements in the horizontal direction is conducted in a manner as follows:

$$f(0,j) = \frac{1}{2\sqrt{2}} \sum_{i=0}^{7} x(i,j)$$

$$f(m,j) = \frac{1}{2} \sum_{i=0}^{7} x(i,j) \cos\frac{(2i+1)m\pi}{16}$$

$$(m = 1, 2, \ldots, 7)\ (j = 0, 1, \ldots, 7)$$

Then, DCT on 8 picture elements in the vertical direction is performed on the transformed video signals $f(0,j)$, $f(m,j)$ in accordance with equations below:

$$F(m,o) = \frac{1}{2\sqrt{2}} \sum_{j=0}^{7} f(m,j)$$

$$F(m,n) = \frac{1}{2} \sum_{j=0}^{7} f(m,j) \cos\frac{(2j+1)n\pi}{16}$$

$$(n = 1, 2, \ldots, 7)\ (m = 0, 1, \ldots, 7)$$

Accordingly, the video signal is expressed as a coefficient $F(m,n)$ (m, n=0, 1, . . . , 7) and outputted to the weighting circuit 123.

Each coefficient inputted ot the weighting circuit 123 is performed weighting. Concretely, supposing that the result of DCT operation for each block of 8 picture elements ×8 lines is divided into four areas as indicated in FIG. 2, since the human eyesight is weak to a high spatial frequency, weighting with small rate is performed on a zone $F_4$ including high spatial frequency components, whereas weighting with large rate is performed on a zone $F_1$ including low spatial frequency components as shown in FIG. 3. A weighting factor $W(m,n)$ is represented by the following equation;

$$W(m,n) = \frac{7-(1-\alpha)m}{7} \times \frac{7-(1-\alpha)n}{7}$$

$$(0 < \alpha \leq 1)\ (m,n = 0, 1, \ldots, 7)$$

The output from the weighting circuit 123 is quantized at the adaptive quantizing circuit 124. Based on the coefficient in each block and the quantizing parameter outputted from the buffer controller 127, the adaptive quantizing step width is selected at the adaptive quantizing circuit 124. The coefficients after weighting are quantized in accordance with the selected optimum quantizing step width. Concretely, a coarse quantizing step width is selected for the video data with a leading end of strong contrast, or a fine quantizing step width is selected for the video data of a detailed part of small amplitude.

The quantized coefficients are variable-length-coded at the variable length coding circuit 125 and stored in the buffer memory 126. The amount of data stored in the buffer memory 126 is checked by the buffer controller 127 so as to prevent the buffer memory 126 from overflowing. The buffer controller 127 decides the quantizing parameter in accordance with the amount of data stored in the buffer memory 126. The quantizing step width in the adaptive quantizing circuit 124 is changed in accordance with this quantizing parameter, and also the coefficients to be coded in the variable length coding circuit 125 is selected in accordance with the amount of data in the buffer memory 126. In other words, the buffer controller 127 increases the reduction rate of data when the buffer memory 126 stores a lot of data. On the other hand, the buffer controller 127 reduces the reduction rate when the amount of data stored in the buffer memory 126 is small. Owing to the adjustment as above at the buffer controller 127, the buffer memory 126 is prevented from overflowing. The data stored in the buffer memory 126 is read with a fixed output rate.

The conventional coding apparatus of high efficiency is constructed in the above-discussed manner, wherein the reduction rate of the image data is controlled by the amount of data stored in the buffer memory 126. Therefore, if the reduction rate is too large, there is a possibility that the image data of, e.g., the background the quality of which will be greatly degraded at the decoder side is reduced so much. In such case, the reproduced image would be conspicuously deteriorated in its quality. It accordingly becomes necessary in order to solve the aforementioned problem to provide the coding apparatus with a buffer memory of a large capacity without a fear of overflowing.

SUMMARY OF THE INVENTION

In one aspect of a coding apparatus of this invention, the optimum quantizing level (quantizing step width) is determined on the basis of the coding amount of the digital image data (number of bits of the variable length code) after the digital image data is once coded, and the digital image data is coded again with the determined optimum quantizing level. At this time, the optimum quantizing level is determined so that the recording density in a recording medium becomes maximum. Since the image data adjacent to each other on the screen or consecutive in time sequence are strongly related to each other, the optimum quantizing level is determined on the basis of the coding amount of these image data.

In another aspect of a coding apparatus of this invention, the optimum weighting factor is determined on the basis of the coding amount of the digital image data after the digital image data is once coded, and the digital image data is coded again with the determined optimum weighting factor.

An object of this invention is therefore to provide a coding apparatus without unnecessarily degrading the image quality.

A further object of this invention is to provide a coding apparatus capable of coding the data as much as possible without making the data overflow a recording medium.

The above and further objects and features of the invention will more fully be apparent from the following detailed description with accompanying drawings.

BRIEF DESCRIPTION OF THE DRAWINGS

FIG. 8 is a table of the relation between the ratio of the number of bits of variable-length-coded data to the recordable number of bits within a recording area and the optimum quantizing level to be selected;

DESCRIPTION OF THE PREFERRED EMBODIMENTS

A coding apparatus of this invention will be discussed in a detailed manner in conjunction with preferred embodiments thereof with reference ot the accompanying drawings.

[First Embodiment]

Figure 1:
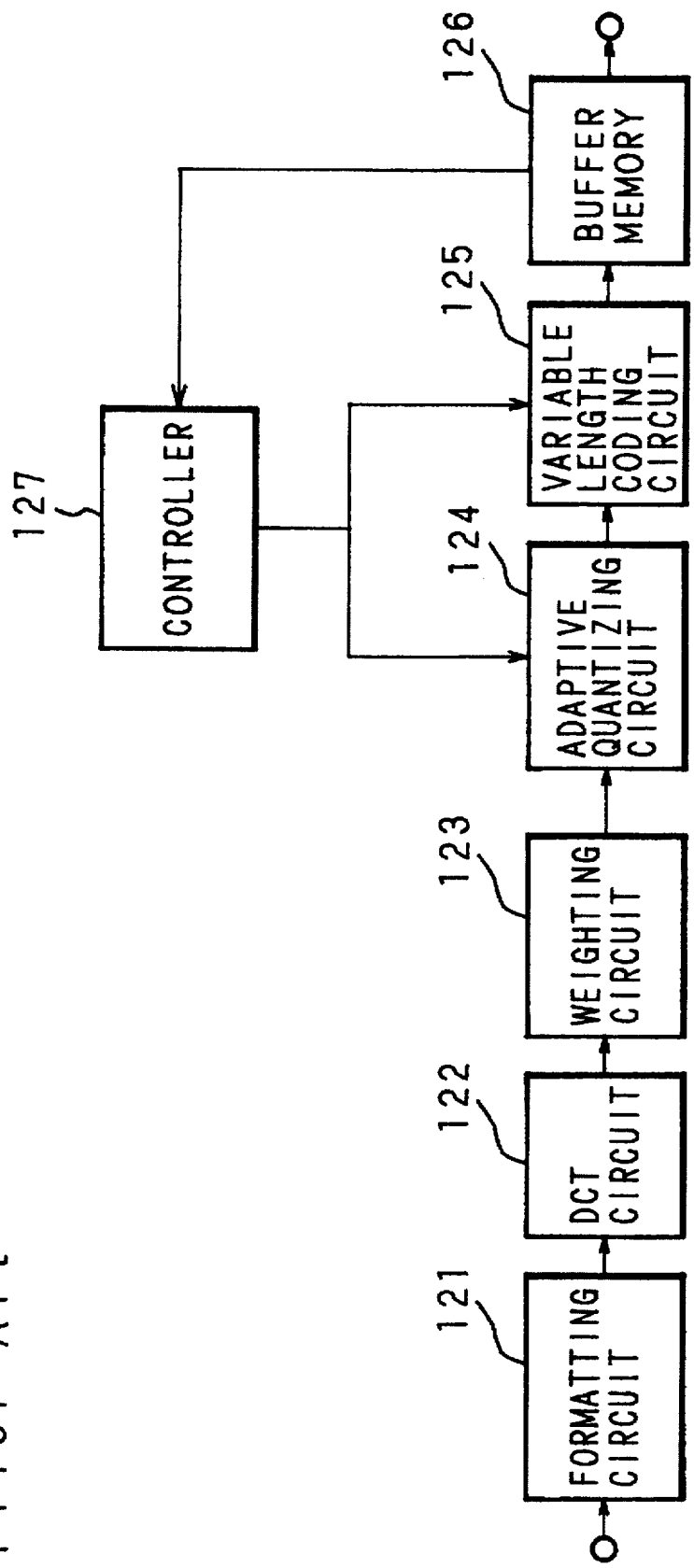
FIG. 1 is a structural block diagram of a conventional coding apparatus.
Figure 2:
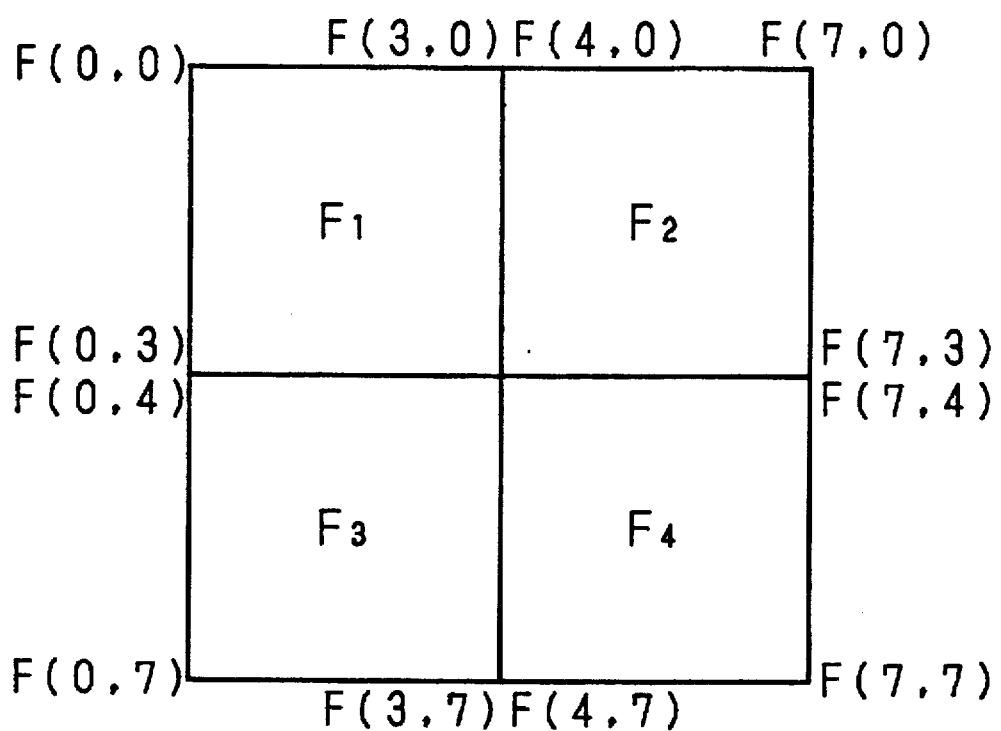
FIG. 2 is a diagram explanatory of the operating concept of a weighting circuit of the conventional coding apparatus.
Figure 3:
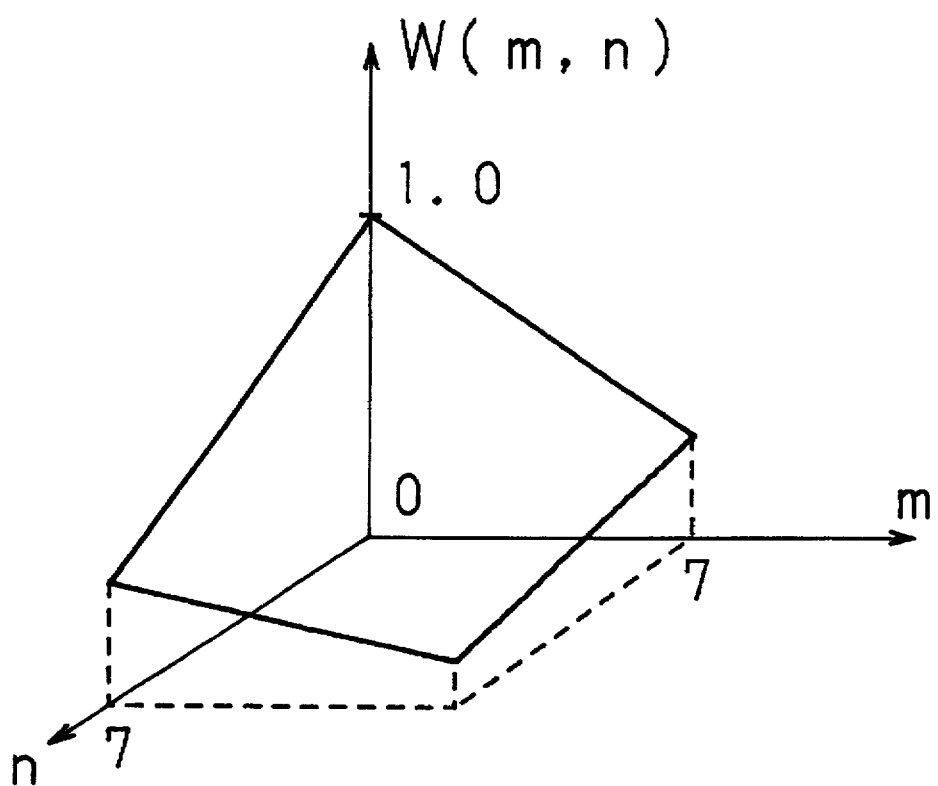
FIG. 3 is a graph of a weighting factor of the weighting circuit of the conventional coding apparatus.
Figure 4:
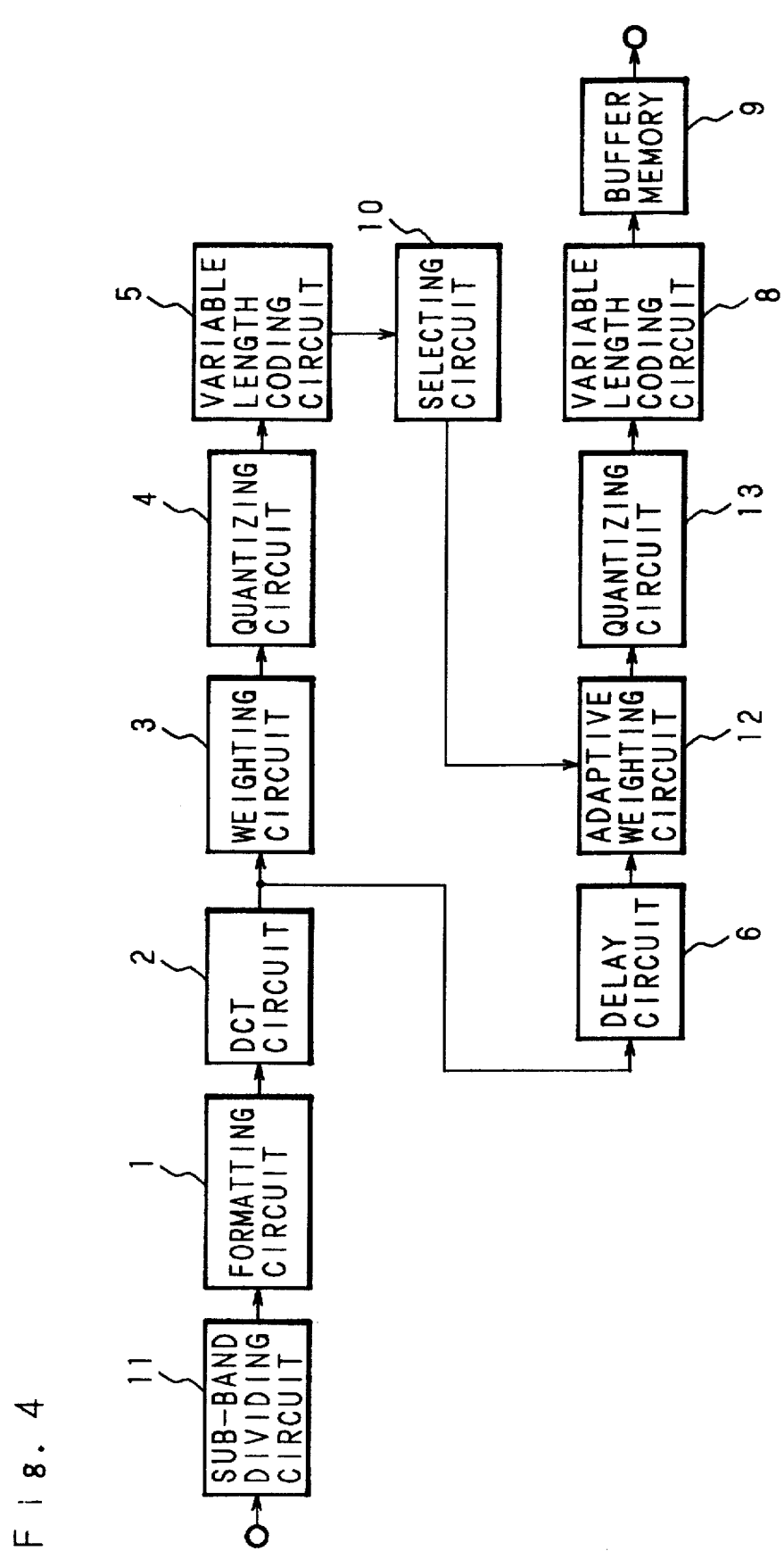
FIG. 4 is a structural block diagram of a coding apparatus according to a first embodiment of this invention.

A coding apparatus of a first embodiment will now be described first. Referring to a block diagram of FIG. 4 showing the structure of a coding apparatus of the first embodiment, the inputted digital image data is divided into a plurality of frequency bands by a sub-band dividing circuit 11 and the divided image data is outputted to a formatting circuit 1. The image data in each frequency band is further divided into a plurality of blocks in the formatting circuit 1. The image data in each block is outputted to a DCT circuit 2. In the DCT circuit 2, the image data of each block from the formatting circuit 1 is performed by Discrete Cosine Transform (DCT). The obtained coefficients are outputted to a weighting circuit 3. Each coefficient is performed weighting at the weighting circuit 3 and then outputted to a quantizing circuit 4. The quantizing circuit 4 quantizes the coefficients after weighting and outputs the quantized coefficients to a variable length coding circuit 5. The variable length coding circuit 5 performs variable length coding on the quantized coefficients, then outputting the variable-length-coded data (variable length code) to a selecting circuit 10. The selecting circuit 10 obtains the coding amount (number of bits) of the variable length code inputted thereto from the variable length coding circuit 5, and selects the optimum weighting factor based on the number of bits. The weighting factor is outputted to an adaptive weighting circuit 12.

Meanwhile, an output of the DCT circuit 2 is outputted to the adaptive weighting circuit 12 with a delay of one block at a delay circuit 6. The output (coefficients) from the delay circuit 6 is performed weighting in the adaptive weighting circuit 12 with the optimum weighting factor obtained in the selecting circuit 10. The coefficients after weighting are outputted to a quantizing circuit 13, where the coefficients after weighting are quantized. The quantized coefficients are outputted to a variable length coding circuit 8. After the quantized coefficients are variable-length-coded in the circuit 8, the obtained data (variable length code) is outputted to a buffer memory 9. The coded data is converted to a fixed rate in the buffer memory 9, stored and outputted at a fixed output rate.

The operation of the coding apparatus of FIG. 4 will be discussed below.

The digital image data inputted ot the sub-band dividing circuit 11 is composed of, for instance, a luminance signal and two color difference signals. These signals are divided in half, for example, in horizontal and vertical frequencies, that is, into LL, LH, HL and HH frequency bands (sub bands). A signal in each sub band is divided into 8 picture elements×8 lines in the formatting circuit 1 and outputted ot the DCT circuit 2. The image data in each block is performed DCT on 8 picture elements in the horizontal and vertical directions in the DCT circuit 2. Each resultant coefficients outputted from the DCT circuit 2 are performed weighting in the weighting circuit 3 in the same manner as in the conventional example. The output of the weighting circuit 3 is quantized in the quantizing circuit 4 and variable-length-coded in the variable length coding circuit 5. The number of bits of the variable length code in each block outputted from the variable length coding circuit 5 is obtained in the selecting circuit 10, according to which the optimum weighting factor is selected and outputted to the adaptive weighting circuit 12.

The coefficients inputted ot the adaptive weighting circuit 12 with one block delay through the delay circuit 6 is performed weighting with the optimum weighting factor selected in the circuit 10. By way of example, in order to reduce the input signal quantized to 8 bits to the size about ⅛ the original, the coding amount (number of bits) of the block of 8 picture elements×8 lines is necessary to be about 70 bits. If the coding amount obtained in the selecting circuit 10 is not larger than 70 bits, the adaptive weighting circuit 12 performs the same weighting as the weighting circuit 3. On the other hand, if the coding amount exceeds 70 bits, the adaptive weighting circuit 12 performs steeper weighting than the circuit 3. For concrete explanation, supposing that the weighting circuit 3 performs weighting by 1-0.9 with the weighting factor W(m,n), the following equation is held;

$$W(m,n) = 1 - 0.1 \times \frac{Max(m,n)}{7}$$

In this case, when the coding amount obtained by the selecting circuit 10 is not larger than 70 bits, the adaptive weighting circuit 12 uses the same weighting factor W(m,n) as the weighting circuit 3. In the case where the coding amount obtained by the selecting circuit 10 is larger than 70 bits and not more than 150 bits, the adaptive weighting circuit 12 performs weighting by 1-0.85 with the weighting factor W(m,n) as follows;

$$W'(m,n) = 1 - 0.15 \times \frac{Max(m,n)}{7}$$

Moreover, if the coding amount is over 150 bits, the adaptive weighting circuit 12 performs weighting by 1-0.75 with the weighting factor W"(m,n) as below;

$$W''(m,n) = 1 - 0.25 \times \frac{Max(m,n)}{7}$$

The output of the adaptive weighting circuit 12 is quantized in the quantizing circuit 13, variable-length-coded in the variable length-coding circuit 8, inputted to the buffer memory 9 and read out at a fixed rate.

It is to be noted here that although the foregoing description is directed to the case where the adaptive weighting circuit 12 switches among three kinds of weighting factors, the adaptive weighting circuit 12 is possible to use any number of kinds of weighting factors which may be set optionally.

[Second Embodiment]

Figure 5:
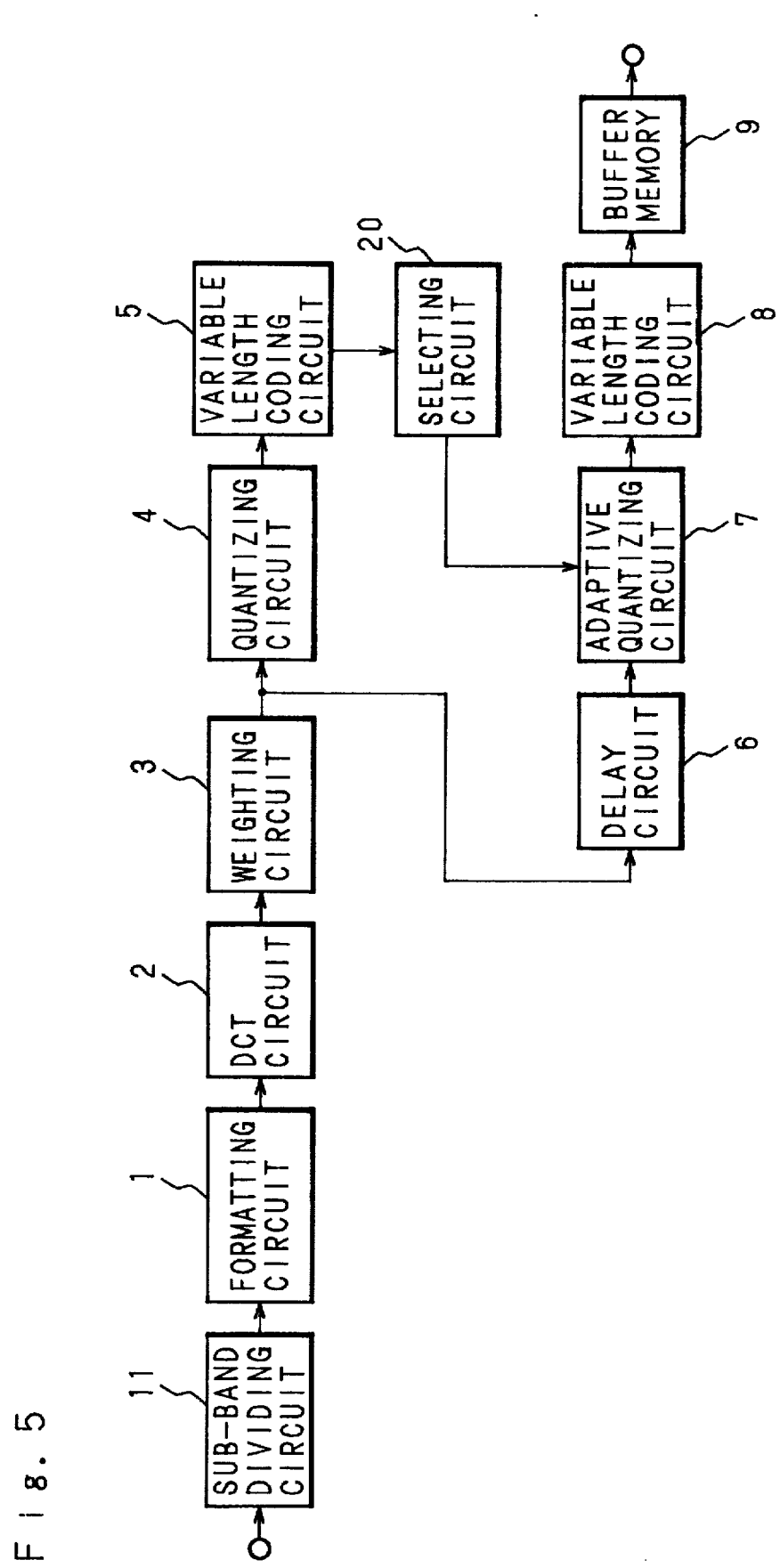
FIG. 5 is a structural block diagram of a coding apparatus according to a second embodiment of this invention.

Now, a coding apparatus of a second embodiment of this invention will be depicted with reference to FIG. 5. In a coding apparatus shown in FIG. 5, references 1, 2, 3, 4, 5, 8, 9 and 11 are respectively a formatting circuit, a DCT circuit, a weighting circuit, a quantizing circuit, a variable length coding circuit, a variable length coding circuit, a buffer memory and a sub-band dividing circuit, all identical to those in FIG. 4, the description of which will be abbreviated here. A delay circuit 6 is connected to an output terminal of the weighting circuit 3, where an output of the weighting circuit 3 is delayed one block and outputted to an adaptive quantizing circuit 7. The adaptive quantizing circuit 7 has a plurality of quantizing tables of different quantizing step widths. A selecting circuit 20 obtains the coding amount (number of bits) of the variable length code, selects the optimum quantizing level (quantizing step width) based on the number of bits and outputs the optimum quantizing level to the adaptive quantizing circuit 7. The coefficients are quantized in the adaptive quantizing circuit 7 with the optimum quantizing level. The quantized data is outputted from the circuit 7 to the variable length coding circuit 8.

The coding apparatus in the above-described structure operates in a manner as follows.

Since the operation from the sub band dividing circuit 11 to the variable length coding circuit 5 goes the same way as in the first embodiment, the description will be omitted. The adaptive quantizing circuit 7 quantizes the coefficients after weighting with the optimum quantizing level selected in the selecting circuit 20 based on the number of bits of the variable length code. For example, when an input signal quantized to 8 bits is desired to be reduced to the size about ⅛ the original, it is necessary ot reduce the coding amount (number of bits) of the block of 8 picture elements ×8 lines to approximately 70 bits. In the case where the coding amount obtained it, the selecting circuit 20 is 70 bits or smaller than 70 bits, the adaptive quantizing circuit 7 selects the same quantizing table as the quantizing circuit 4. If the coding amount is over 70 bits, however, the adaptive quantizing circuit 7 switches the quantizing table to one having a coat set quantizing step width than used in the quantizing circuit 4. The output from the adaptive quantizing circuit 7 is variable-length-coded in the variable length coding circuit 8 and inputted to the buffer memory 9 and read out at a fixed rate.

In the above first and second embodiments, the selecting circuit 10, 20 obtain the coding amount of the variable length codes in one block. However, it may be so arranged as to obtain the coding amount of a plurality of blocks, with letting a plurality of blocks delayed in the delay circuit 6. Moreover, although the input of the selecting circuits 10, 20 is a variable length code, the variable length coding circuit 5 may output only the number of bits of the variable length code to the selecting circuits 10, 20, because the selecting circuits 10, 20 necessitate only the coding amount. Further, the reduction rate is not limited to ⅛ as in the above embodiments.

[Third Embodiment]

Figure 6:
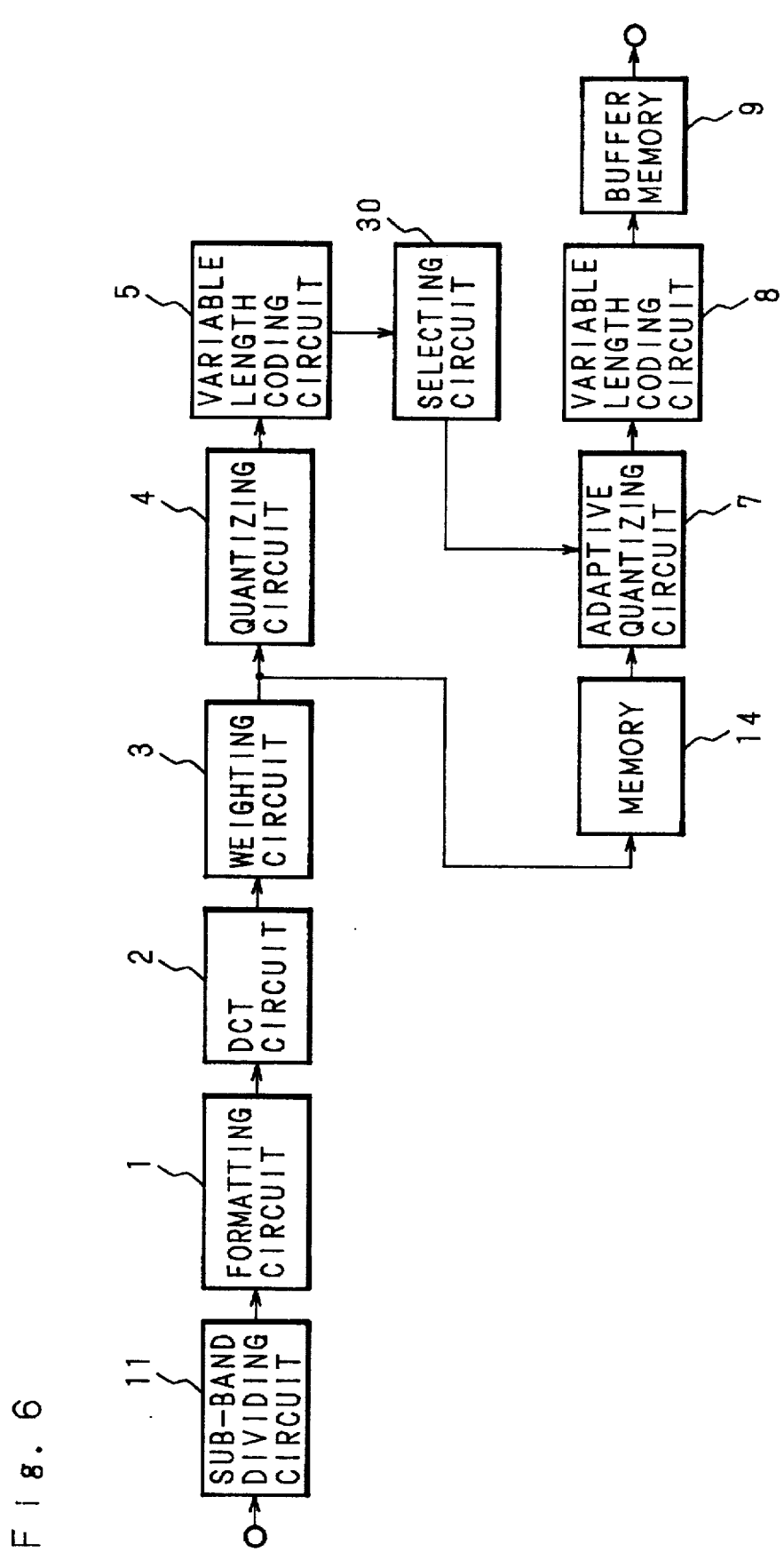
FIG. 6 is a structural block diagram of a coding apparatus according to a third embodiment of this invention.

A coding apparatus according to a third embodiment of this invention will be discussed hereinbelow. FIG. 6 illustrates the structure of a coding apparatus of the third embodiment, wherein references 1 through 5, 7, 8, 9 and 11 represent respectively a formatting circuit, a DCT circuit, a weighting circuit, a quantizing circuit, a variable length coding circuit, an adaptive quantizing circuit, a variable length coding circuit, a buffer memory and a sub-band dividing circuit. These parts are completely the same as shown in FIG. 5 and therefore, the description thereof will be abbreviated for brevity. A memory 14 stores coefficients after weighting outputted from the weighting circuit 3. The data stored in the memory 14 is read to the adaptive quantizing circuit 7 upon necessities. A selecting circuit 30 compares the number of bits of the inputted data (variable length code) with the recordable number of bits in a recording area of a recording medium such as a tape, etc. Then, it selects the optimum quantizing level (quantizing width step) so that the recording density in the recording medium becomes maximum, in other words, the data can be recorded as much as possible within a predetermined recording area (for example, one track) of the recording medium, and outputs the selected optimum quantizing level to the adaptive quantizing circuit 7.

The operation of the coding apparatus of FIG. 6 will be discussed below.

Figure 7:
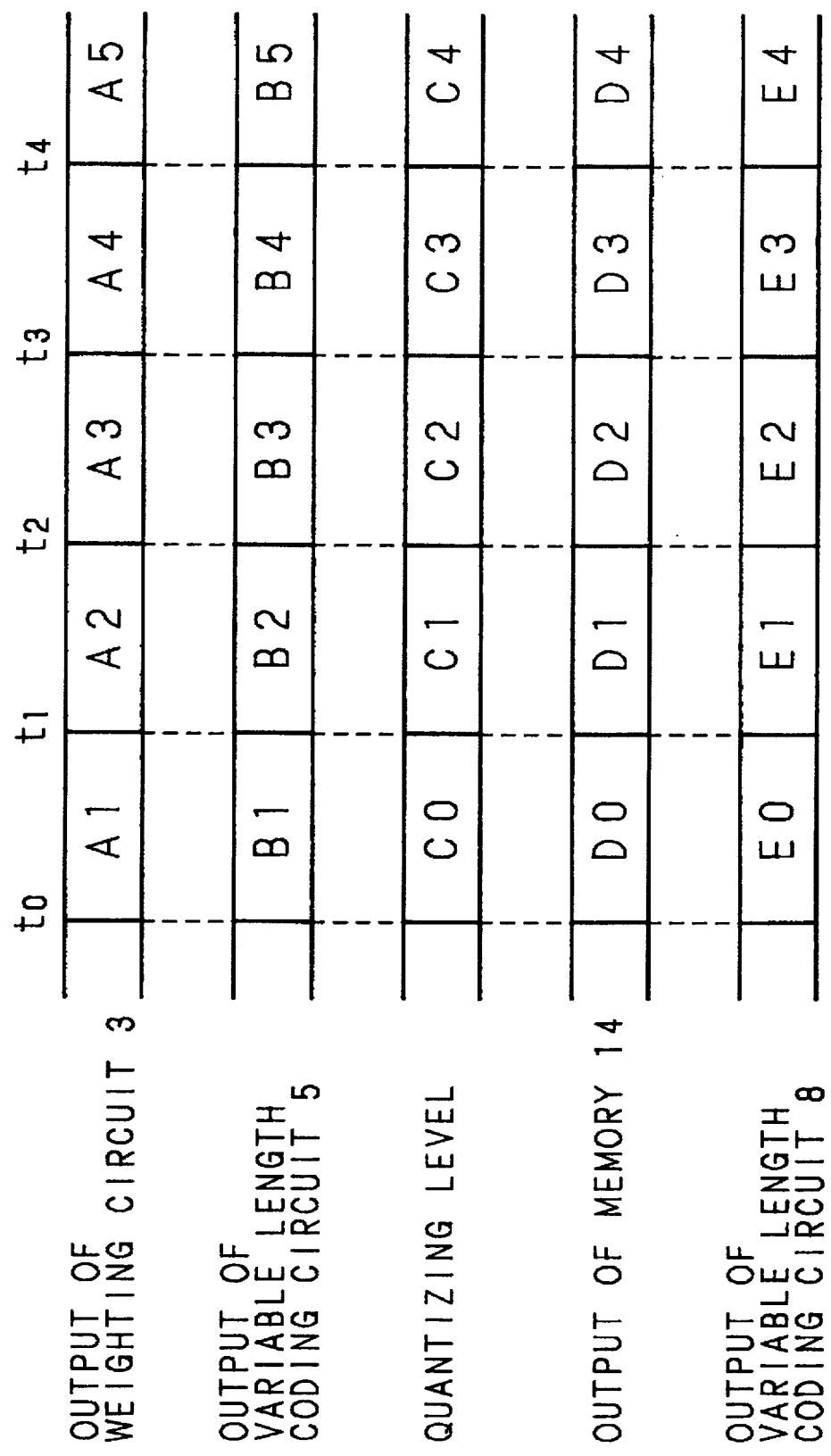
FIG. 7 is a chart of the data timing in the coding apparatus of FIG. 6.

The operation from the sub-band dividing circuit 11 to the weighting circuit 3 is the same as in the first embodiment, the description of which will therefore be abbreviated here. Now, the operation after the weighting circuit 3 will be depicted with reference to FIG. 7 showing the data timing. Referring to FIG. 7, sections t0–t1, t1–t2, t2–t3 and t3–t4 are fixed blocks of data to be recorded in a recording area. A coefficient A1 outputted from the weighting circuit 3 during a time t0–t1 is not only quantized in the quantizing circuit 4, but stored in the memory 14. The data after being quantized to a predetermined number of bits in the quantizing circuit 4 is variable-length-coded in the variable length coding circuit 5 and the obtained data B1 is outputted from the circuit 5 to the selecting circuit 30. At this time, Huffman code or run-length code is used for variable length coding in the circuit 5. A code of a smaller number of bits is assigned to the data which appears frequently, whereas a code of a larger number of bits is assigned to the data with low frequency of appearance. When a data B1 variable-length-coded during the time t0–t1 is inputted to the selecting circuit 30, the number of bits of the data B1 is compared with the recordable number of bits, whereby an optimum quantizing level C1 allowing the data to be recorded as much as possible within the recording area is selected. The quantizing level C1 is the optimum quantizing level when the coefficient A1 outputted from the weighting circuit 3 during the time t0–t1 is coded. This quantizing level C1 is outputted to the adaptive quantizing circuit 7.

FIG. 8 is a table showing the relation between the ratio of the number of bits of the variable-length-coded data to the recordable number of bits and, the quantizing level to be selected. The quantizing level in the table represents the optimum quantizing level set so as to record the data as much as possible within the recording area. The larger the ratio of the number of bits of the variable-length-coded data is, the smaller the selected quantizing level is.

In accordance with the optimum quantizing level C1 selected in the selecting circuit 30, a coefficient D1 stored in the memory 14 during the time t0–t1 is quantized in the adaptive quantizing circuit 7. The data quantized to a predetermined number of bits in the adaptive quantizing circuit 7 is then variable-length-coded in the variable length coding circuit 8 in same manner as in the variable length coding circuit 8. The obtained data E1 is outputted to the buffer memory 9. Thus, a variable length code is outputted from the buffer memory 9 at a fixed output rate.

Likewise, during a time t1–t2 when a coefficient A2 is outputted from the weighting circuit 3 to the quantizing circuit 4 and memory 14, an optimum quantizing level C2 is selected in the selecting circuit 30 on the basis of the variable-length-coded data B2 and, an output D2 of the memory 14 is quantized with the quantizing level C2 thereby to obtain the variable-length-coded data E2. Thereafter, the above sequence of procedures is repeated every time each of the coefficients A3, A4, A5 . . . is outputted from the weighting circuit 3. Accordingly, the whole of the image data is variable-length-coded.

As is described hereinabove, in the coding apparatus of the third embodiment, the number of blocks to be recorded in a predetermined recording area is fixed, and at the same time, the optimum quantizing level is selected based on the number of bits of the variable-length-coded data, and the data is again variable-length-coded with the optimum quantizing level. Therefore, it is made possible to record the data as much as possible without overflowing the predetermined recording area.

[Fourth Embodiment]

Figure 9:
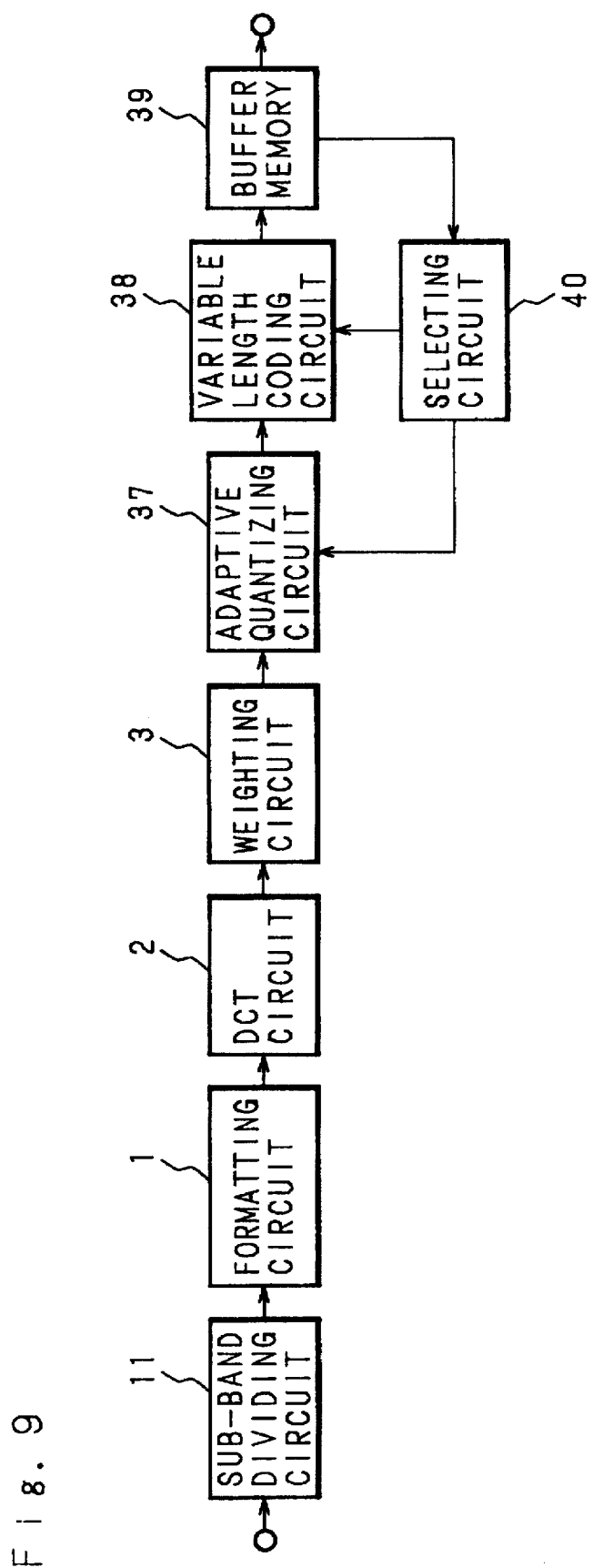
FIG. 9 is a structural block diagram of a coding apparatus according to a fourth embodiment of this invention.

A fourth embodiment of this invention will not be explained below. In FIG. 9, there is indicated a structural block diagram of a coding apparatus according to the fourth embodiment, having the same formatting circuit 1, DCT circuit 2, weighting circuit 3 and sub-band dividing circuit 11 as in FIG. 6. The weighting circuit 3 outputs the coefficients after weighting to an adaptive quantizing circuit 37. The adaptive quantizing circuit 37 with a plurality of quantizing tables of different quantizing step widths quantizes the coefficients after weighting with the quantizing level selected in a selecting circuit 40. The quantized coefficients are outputted to a variable length coding circuit 38. The variable length coding circuit 38 performs variable length coding on the quantized coefficients and outputs the obtained data to a buffer memory 39. The buffer memory 39 converts and stores the variable-length-coded data to a fixed rate, outputting at a fixed output rate.

In the selecting circuit 40, the optimum quantizing level is selected on the basis of the number of bits of the variable-length-coded data stored in the buffer memory 39 so that the recording density in a recording medium, e.g., a tape or the like, becomes maximum, that is, the data can be recorded as much as possible within a predetermined recording area (e.g., one track). The selected quantizing level is outputted to the adaptive quantizing circuit 37. At the same time, the selecting circuit 40 selects coefficients to be variable-length-coded in the circuit 38.

The operation of the coding apparatus in the above structure will be discussed.

Figure 10:
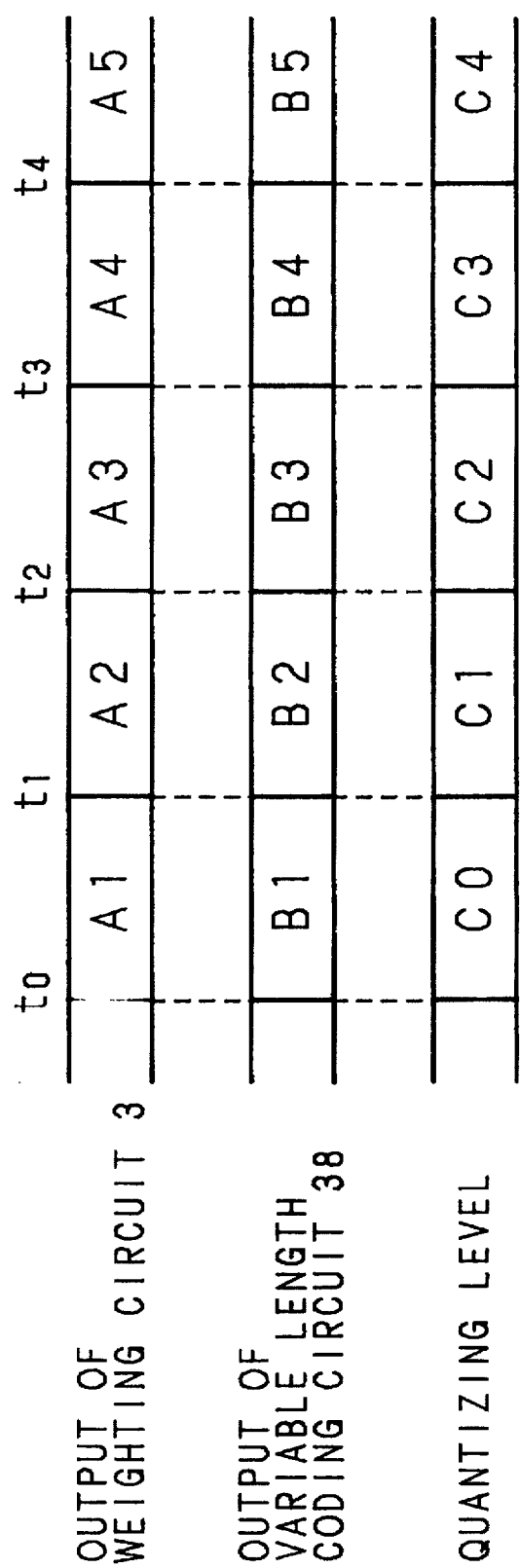
FIG. 10 is a chart of the data timing in the coding apparatus of FIG. 9.

Since the operation from the sub-band dividing circuit 11 to the weighting circuit 3 is carried out in the same manner as in the third embodiment, the description thereof will be abbreviated and the following description is related to the operation after the weighting circuit 3. Referring to a chart of the data timing of FIG. 10, sections defined by t0–L1, t1–t2, t2–t3 and t3–t4 are fixed blocks of the data to be recorded in one recording area. In the first place, a coefficient A1 outputted from the weighting circuit 3 during a time t0–t1 is quantized in the adaptive quantizing circuit 37 with a quantizing level C0 selected in the selecting circuit 40. The quantized data is variable-length-coded in the variable length coding circuit 38 to be a data B1. The data B1 is outputted to the buffer memory 39. Huffman code or run-length code is used for variable length coding in the circuit 38 as in the circuits 5, 8 of the third embodiment, with a code of a smaller number of bits being assigned to the data of high frequency of appearance and a code of a larger number of bits assigned to the data of lower frequency of appearance. The variable-length-coded data B1 is stored in the buffer memory 39 and outputted at a fixed output rate.

When the variable-length-coded data B1 is inputted from the buffer memory 39 to the selecting circuit 40, the number of bits of the data B1 is counted, and the optimum quantizing level Cl is selected on the basis of the counted number of bits to record the data as much as possible within the recording area. The standard for selection of the optimum quantizing level in this case may be such as shown in FIG. 8. The quantizing level C1 is outputted from the selecting circuit 40 to the adaptive quantizing circuit 37.

A coefficient A2 is outputted from the weighting circuit 3 to the adaptive quantizing circuit 37 during a time t1-t2. The coefficient A2 is quantized with the optimum quantizing level Cl selected in the selecting circuit 40. The coefficient quantized in the adaptive quantizing circuit 37 is variable-length-coded in the variable length coding circuit 38, thereby obtaining a variable-length-coded data B2. The quantizing level C1 is the optimum to the coefficient A1 outputted from the weighting circuit 3 during the time t1-t2. Since the image data adjacent to each other, i.e., coefficients A1 and A2 in this case are related to each other having little change of the amount or data, the quantizing level C1 which is optimum to the coefficient A1 is considered optimum also to the coefficient A2 adjacent to the coefficient A1, and there would be no problem if the coefficient A2 be quantized with this quantizing level C1.

The optimum quantizing level C2 is selected on the basis of the number of bits of the variable-length-coded data B2 from the coefficient A2. A next coefficient A3 is quantized with the quantizing level C2. The above sequence of procedures is repeated to complete variable length coding of all the image data.

Accordingly, in the fourth embodiment as compared with the third embodiment, it is possible to eliminate the circuit for storing the output from the weighting circuit 3 (memory 14 of FIG. 6) and one quantizing and variable length coding mechanism (quantizing circuit 4 and variable length coding circuit 5 of FIG. 6).

[Fifth Embodiment]

A coding apparatus according to a fifth embodiment will be discussed now. In the third and fourth embodiments described earlier, the optimum quantizing level is selected with using only the number of bits of the once variable-length-coded data in order to obtain a code allowing the data to be recorded as much as possible in the recording area. Therefore, the accuracy in variable length coding at the second time is not enough. The recording area may sometimes be left without being used or the data may overflow the recording area. The fifth embodiment is devised to improve the aforementioned disadvantage.

Figure 11:
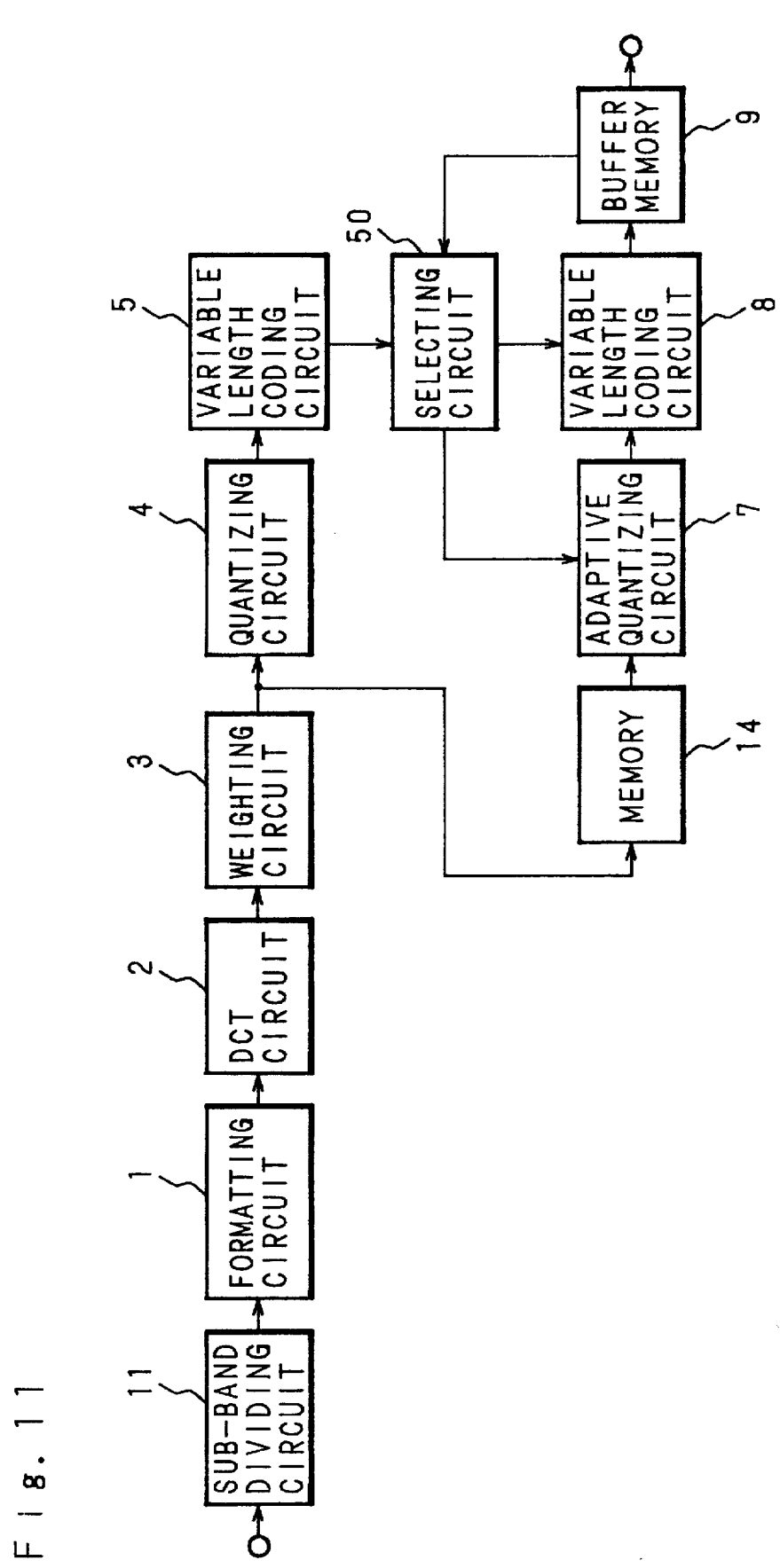
FIG. 11 is a structural block diagram of a coding apparatus according to a fifth embodiment of this invention.

In FIG. 11 showing the structure of a coding apparatus of the fifth embodiment, references 1 through 5, 7, 8, 9, 11 and 14 are a formatting circuit, a DCT circuit, a weighting circuit, a quantizing circuit, a variable length coding circuit, an adaptive quantizing circuit, a variable length coding circuit, a buffer memory, a sub-band dividing circuit and a memory, which are equivalent to the corresponding parts illustrated in FIG. 6. A selecting circuit 50, comparing the number of bits obtained based on the number of bits of the variable length code inputted thereto and the number of bits of the variable length code of a preceding block with the recordable number of bits, selects the optimum quantizing level (quantizing step width) so that the recording density in a recording medium such as a tape or the like becomes maximum, i.e., the data can be recorded as much as possible within a predetermined recording area (for example, one track). The selected quantizing level is outputted to the adaptive quantizing circuit 7.

The coding apparatus of FIG. 11 will operate in the following manner.

Figure 12:
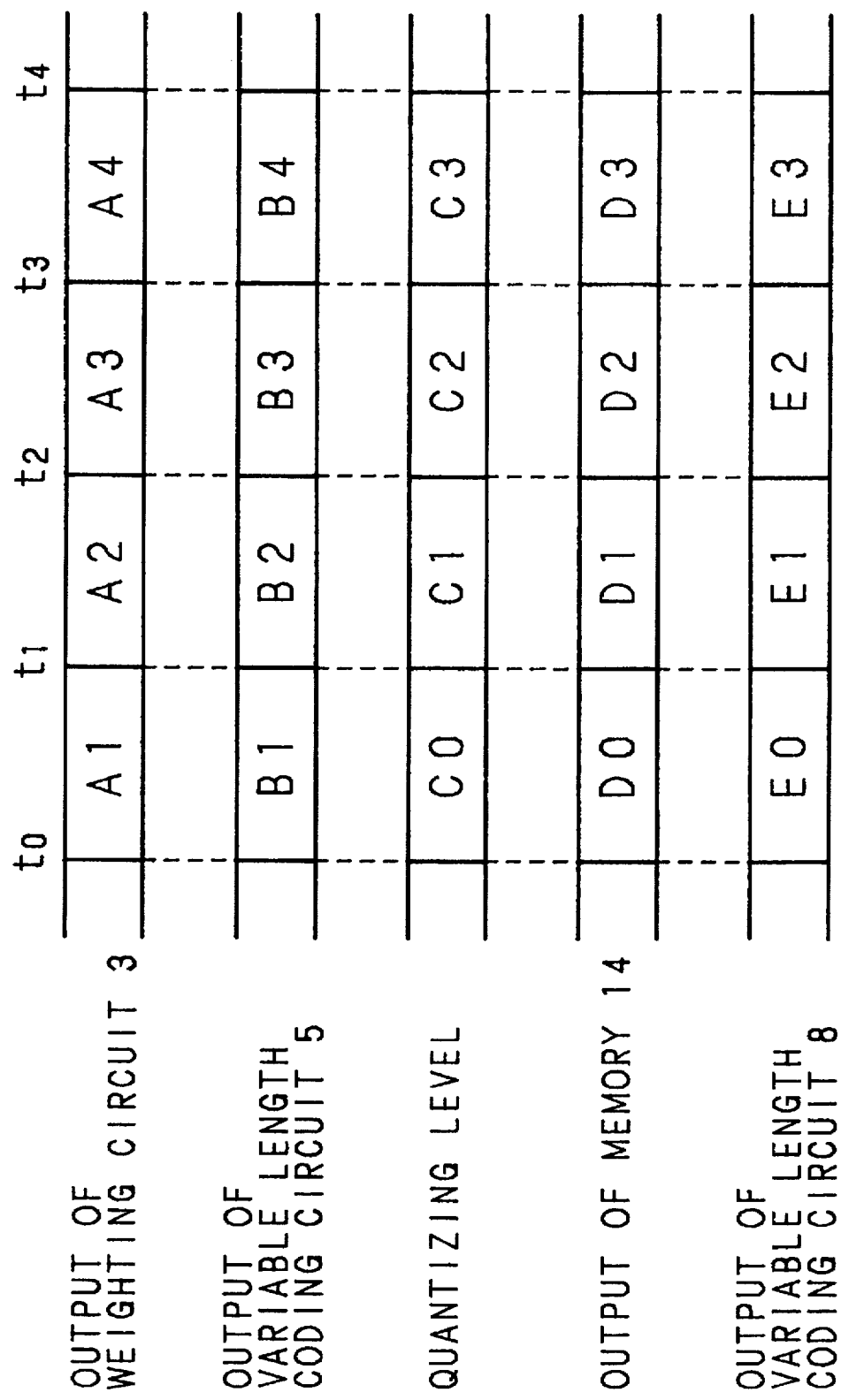
FIG. 12 is a chart of the data timing in the coding apparatus of FIG. 11.
Figure 13:
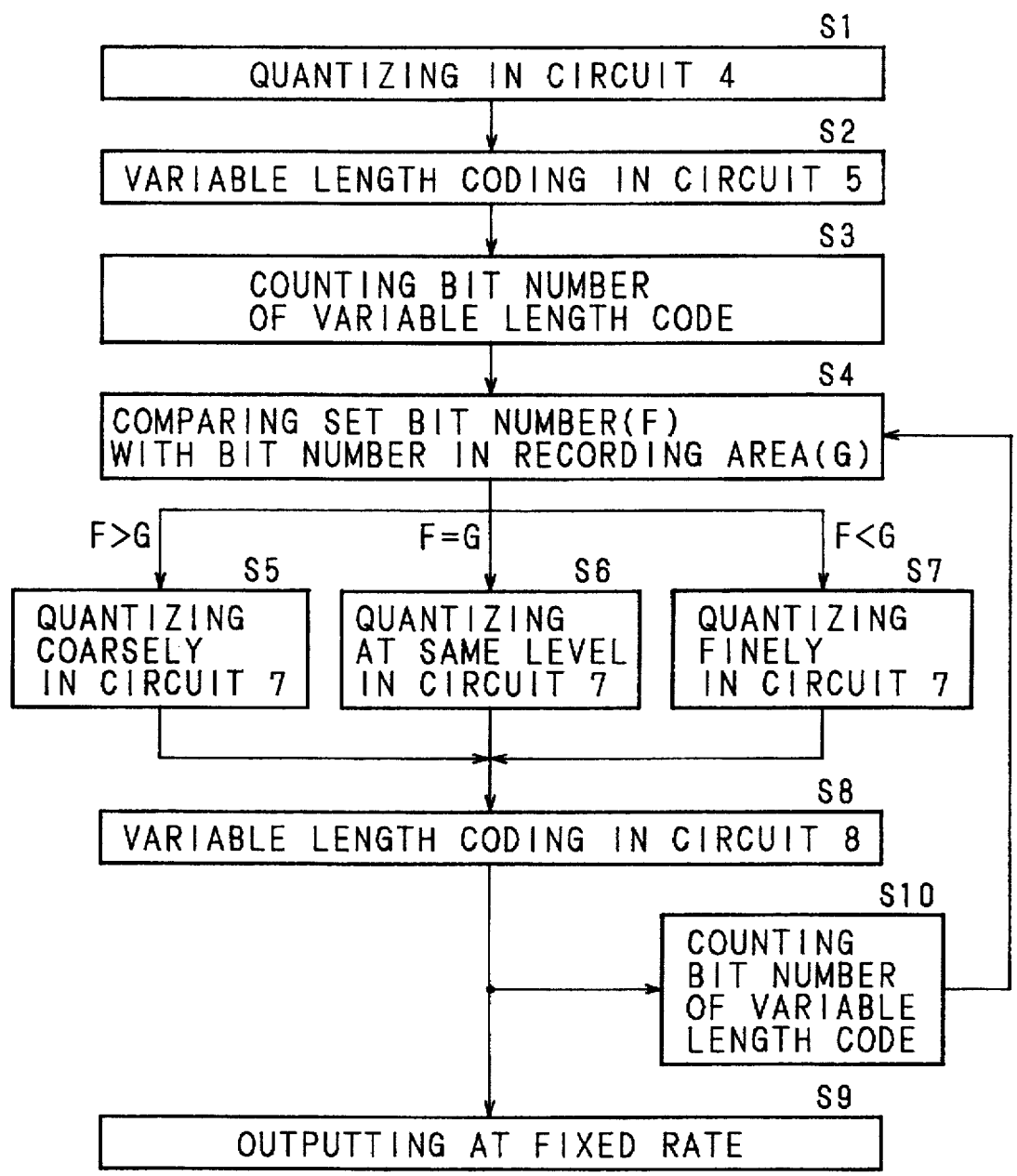
FIG. 13 is a flow chart of the coding apparatus of FIG. 11.

Since the operation of the coding apparatus from the sub-band dividing circuit 11 to the weighting circuit 3 is the same as in the first embodiment described earlier, the description thereof will be omitted. Now, the operation after the weighting circuit 3 will be depicted with reference to a chart of the data timing shown in FIG. 12 and a flow chart of FIG. 13. In FIG. 12, sections defined by t0-t1, t1-t2, t2-t3 and t3-t4 are fixed blocks of the data to be recorded in a recording area. A coefficient A1 outputted from the weighting circuit 3 during a time t0-t1 is quantized (S1) in the quantizing circuit 4 and stored in the memory 14. The data quantized to a predetermined number of bits in the circuit 4 is variable-length-coded (S2) in the variable length coding circuit 5. The resultant data B1 is outputted to the selecting circuit 50. Variable length coding in the circuit 5 employs Huffman code or run-length code. A code of a smaller number of bits is assigned to the data of high frequency of appearance, while a code of a larger number of bits is assigned to the data of small appearing frequency. The variable-length-coded data B1 obtained during the time t0-t1 is inputted ot the selecting circuit 50, and the number of, bits of the data B1 is counted there (S3). Thereafter., a bit number F is set on the basis of the counted number of bits of the current data B1 and the counted number of bits of the variable length code in a block prior to the time t1, and compared with a recordable number of bits G recordable in the recording area (S4). As a result, an optimum quantizing level C1 is selected to record the data as much as possible in the recording area. The reason why the counted number of bits of the data which has been variable-length-coded before is taken into consideration is to record the data as much as possible within the recording area with good accuracy since the blocks adjacent to each other or consecutive in time sequence at the same position on the screen are strongly related to each other with little change of the amount of data therebetween.

The quantizing level C1 is the optimum level to code the coefficient A1 outputted from the weighting circuit 3 during the time t0-t1. The quantizing level C1 is outputted to the adaptive quantizing circuit 7. Concretely, if the set number of bits F is larger than the recordable number of bits G, the quantizing level to effect coarse quantization is selected. On the other hand, if F is equal to G, the same quantizing level is selected. When F is smaller than G, the quantizing level to quantize finely is selected. As indicated in FIG. 8, for example, the optimum quantizing level is selected from a plurality of quantizing levels based on the ratio between the set bit number and recordable bit number.

The adaptive quantizing circuit 7 quantizes a coefficient D1 which is stored in the memory 14 during the time t0-t1, with the optimum quantizing level C1 selected by the selecting circuit S0 (S5, S6 or S7). The data after being quantized to a predetermined number of bits in the adaptive quantizing circuit 7 is variable-length-coded in the variable length coding circuit 8 in the same method as in the circuit 5 (S8). The obtained data E1 is outputted to the buffer memory 9 and a variable length code is outputted from the buffer memory 9 at a fixed output rate (S9). The number of bits of the data E1 to be used in order to set the optimum quantizing level for a next coefficient A2 is counted (S10).

When the coefficient A2 is outputted form the weighting circuit 3 to the quantizing circuit 4 and memory 14 during the time t1–t2, similarly, an optimum quantizing level C2 is selected in the selecting circuit 50 based on the variable-length-coded data B2. In selecting the optimum quantizing level C2 from the number of bits of the data B2 at the time t2, the preceding data, namely, the quantizing level C1 used when the coefficient A1 from the weighting circuit 3 is variable-length-coded and the number of bits of the variable-length-coded data E1 are taken into consideration. An output D2 from the memory 14 is quantized with the quantizing level C2 thereby to obtain a variable-length-coded data E2. In the manner as above, every time a coefficient A3, A4, A5 ... is outputted from the weighting circuit 3, the foregoing process is repeated, so that all the image data is completely variable-length-coded.

In the fifth embodiment, the optimum quantizing level is selected in accordance with both the number of bits of the variable length code of certain image data and the number of bits of the variable length code of the other image data which has been variable-length-coded earlier. Since the adaptive quantization and variable length coding are performed again with using this optimum quantizing level, according to the fifth embodiment in comparison with the third embodiment, it is possible to record the data as much as possible within the predetermined recording area more accurately while keeping the recording density in the recording medium maximum.

Meanwhile, all the coefficients must be stored in the memory before the second variable length coding is performed in the above third and fifth embodiments, thereby requiring a large capacity for the memory. The sixth and seventh embodiments described later are proposed to solve this problem.

[Sixth Embodiment]

Figure 14:
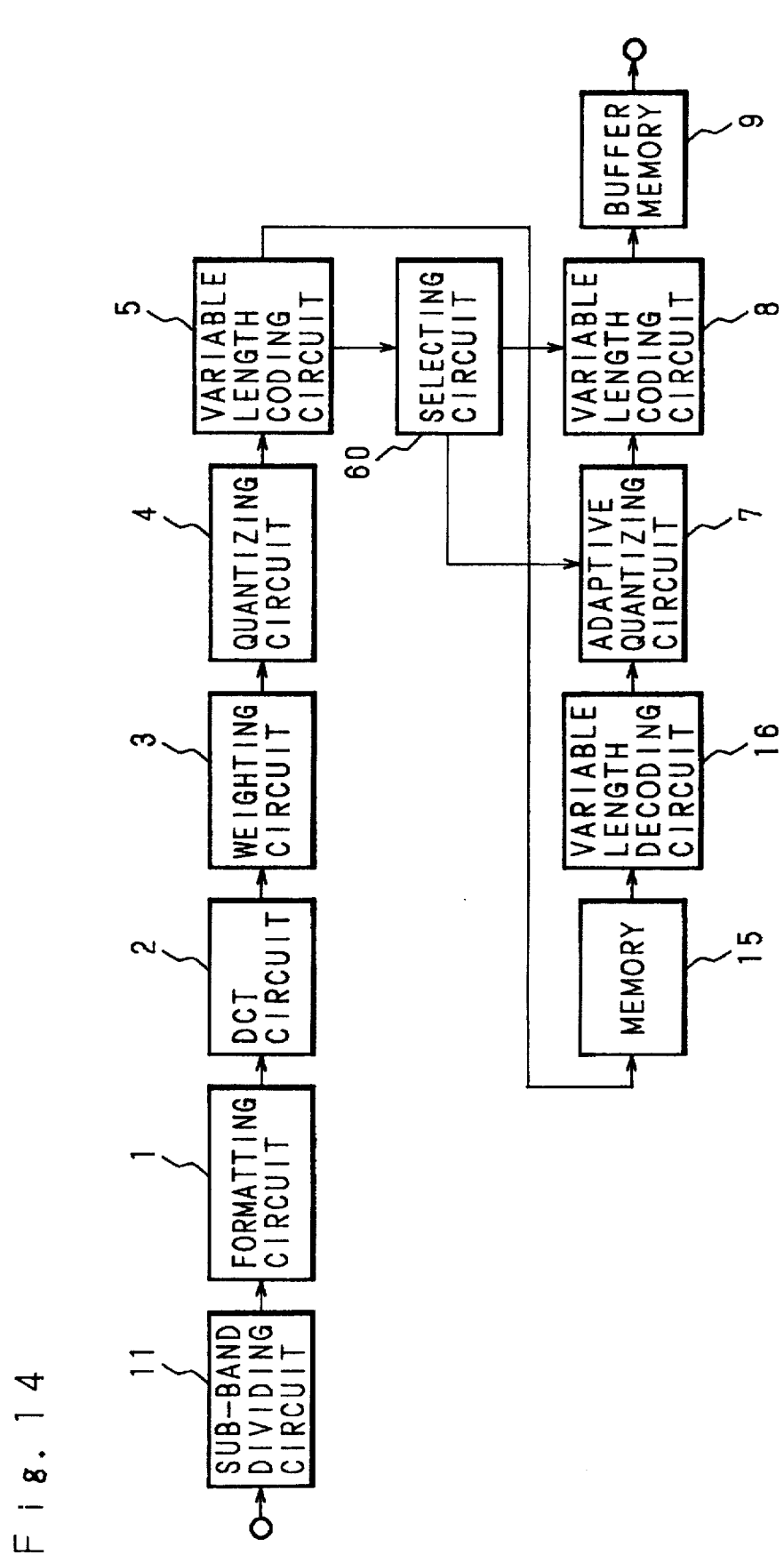
FIG. 14 is a structural block diagram of a coding apparatus according to a sixth embodiment of this invention.

Referring to FIG. 14 showing a coding apparatus of a sixth embodiment, a formatting circuit, a DCT circuit, a weighting circuit, a quantizing circuit, a variable length coding circuit, an adaptive quantizing circuit, a variable length coding circuit, a buffer memory and a sub-band dividing circuit designated respectively by references 1, 2, 3, 4, 5, 7, 8, 9 and 11 are identical to those parts shown in FIG. 11. A memory 15 stores a variable length code outputted from the variable length coding circuit 5 and outputs the code to a variable length decoding circuit 16 upon necessities. The variable length decoding circuit 16 decodes the variable length code and outputs the coefficients, that is, the initial data to the adaptive quantizing circuit 7. A selecting circuit 60 selects the optimum quantizing level on the basis of the number of bits of the variable length code inputted form the variable length coding circuit 5 and outputs the same to the adaptive quantizing circuit 7.

The coding apparatus will operate as follows.

Figure 15:
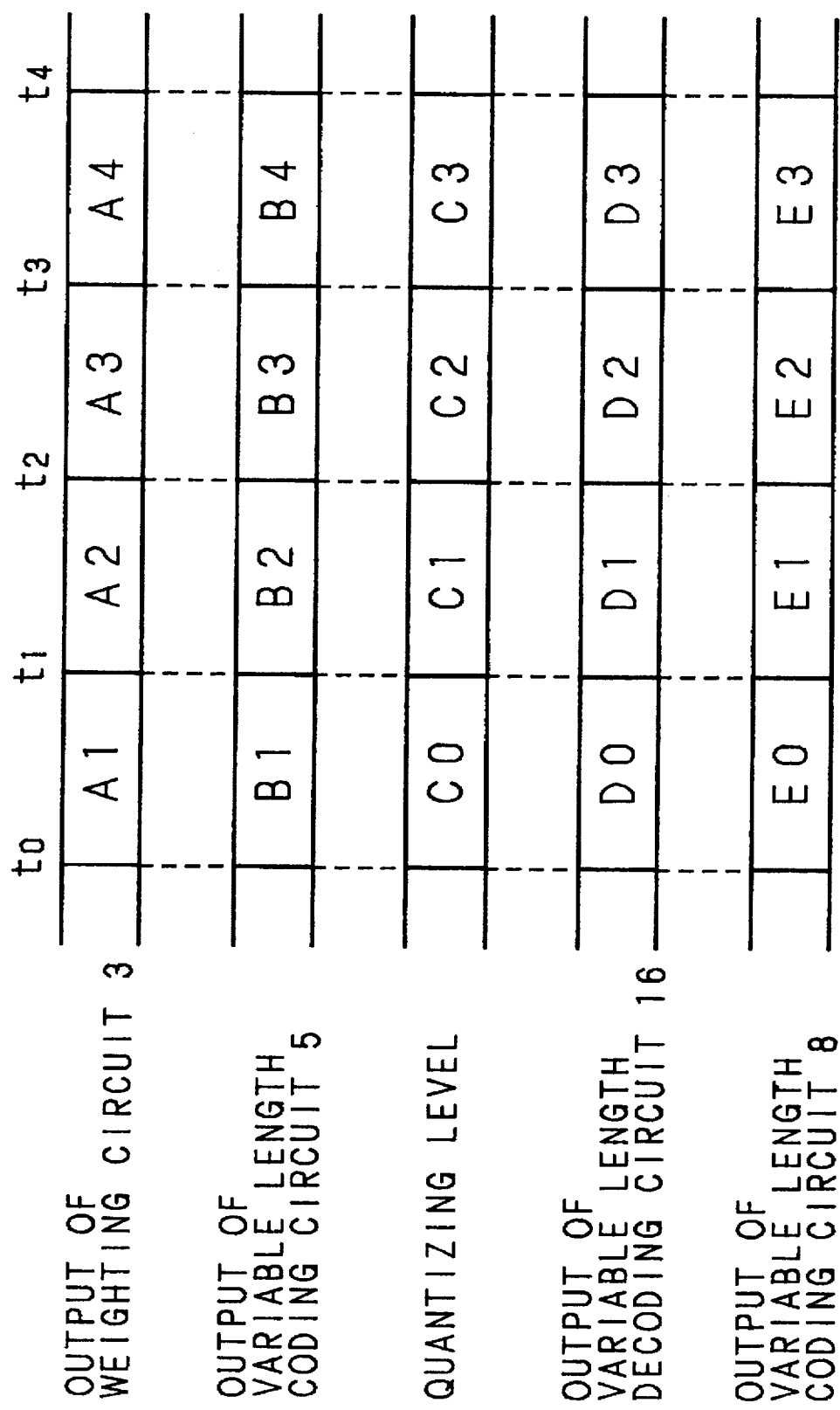
FIG. 15 is a chart of the data timing in the coding apparatus of FIG. 14.
Figure 16:
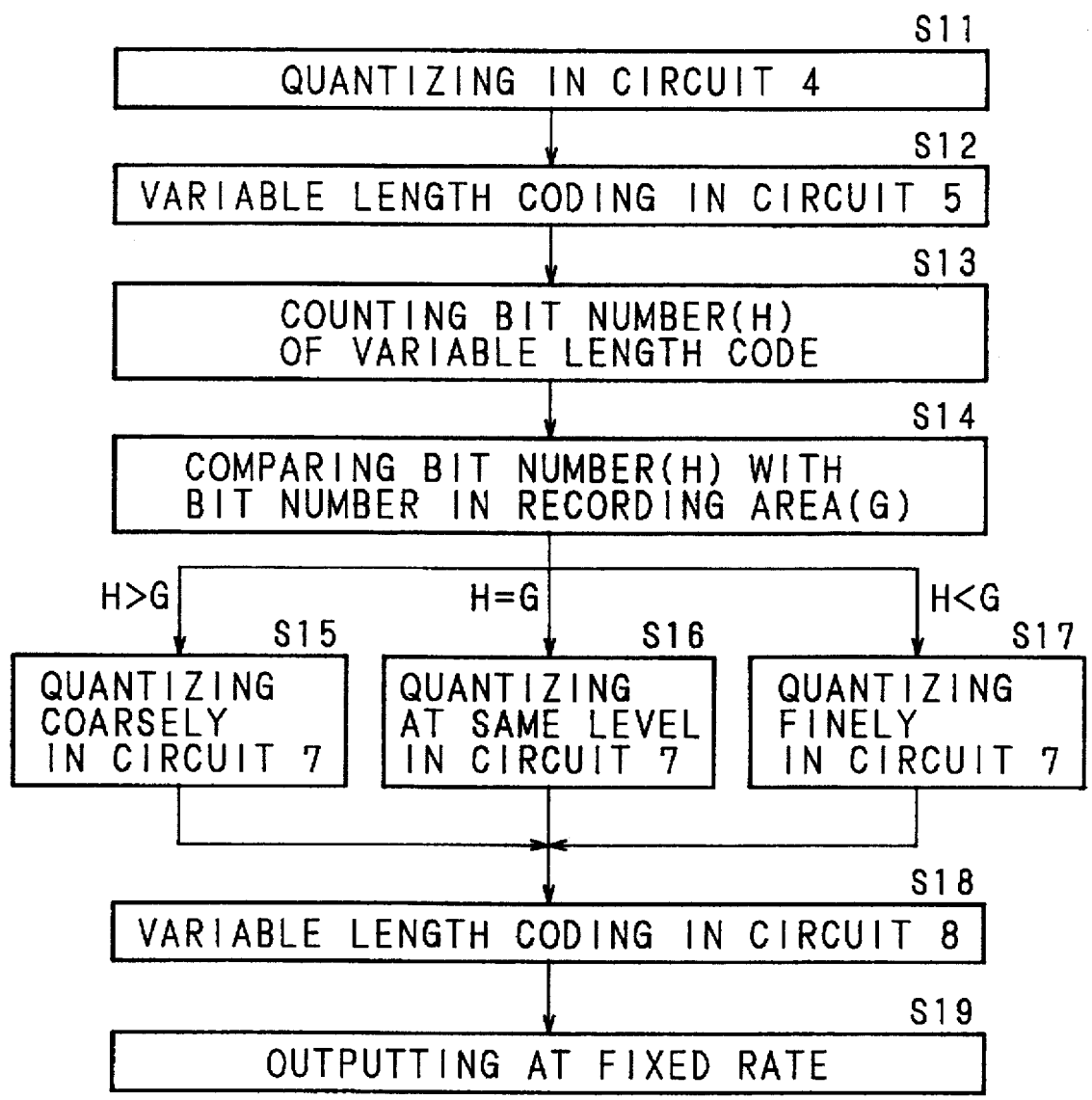
FIG. 16 is a flow chart of the coding apparatus of FIG. 14.
Figure 18:
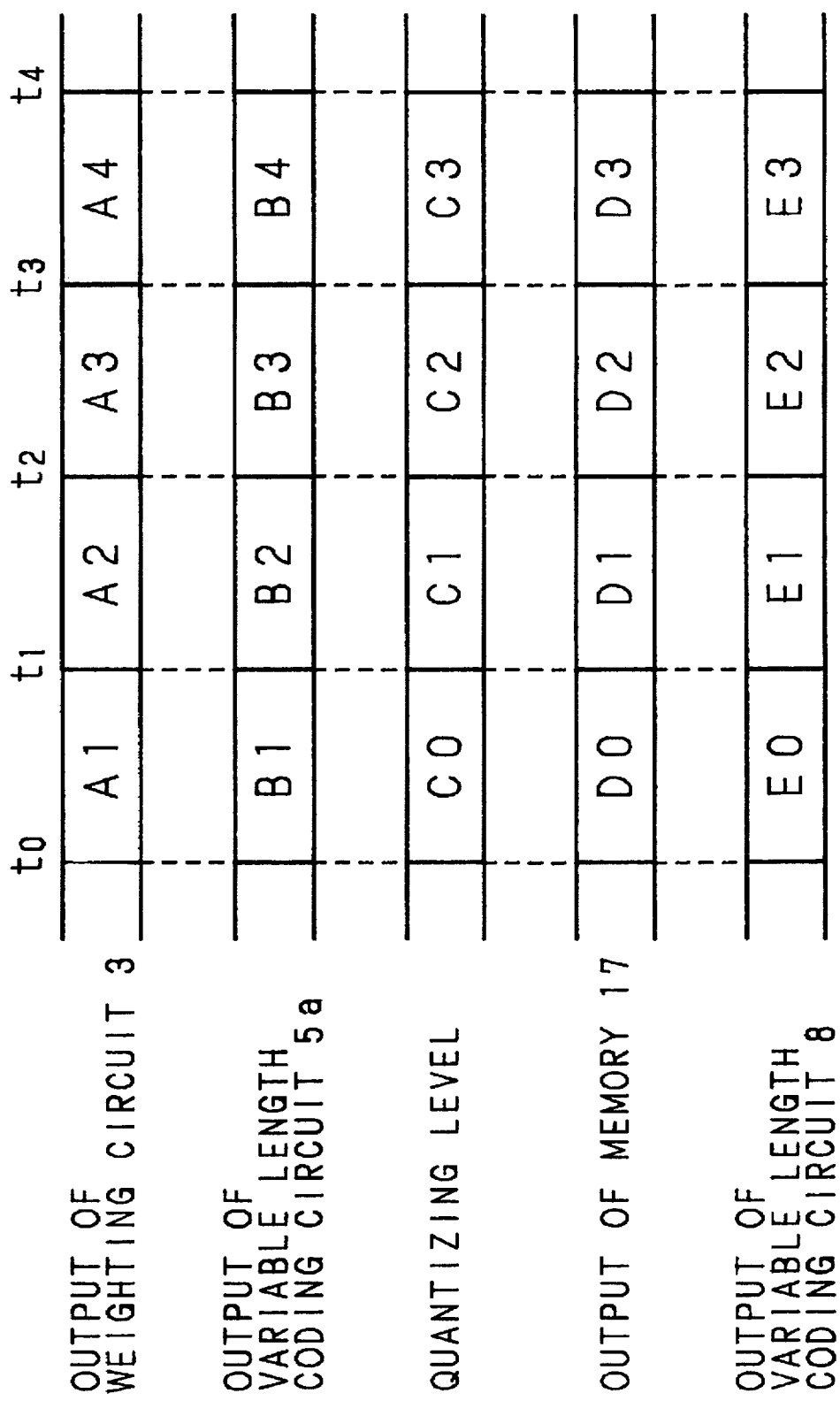
FIG. 18 is a chart of the data timing of the coding apparatus of FIG. 17.

Since the coding apparatus from the sub-band dividing circuit 11 to the weighting circuit 3 is driven in the same way as explained in the third embodiment, the description thereof will be abbreviated, and the operation after the weighting circuit 3 will be discussed below with reference to FIGS. 15 and 18. In a timing chart of FIG. 15, sections defined by t0–t1, t1–t2, t2–t3 and t3–t4 are fixed blocks of the data to be recorded in a recording area. A coefficient A1 outputted from the weighting circuit 3 during a time t0–t1 is quantized in the quantizing circuit 4 (S11). The quantized data of a predetermined number of bits obtained in the quantizing circuit 4 is variable-length-coded in the variable length coding circuit 5 (S12), the result of which is outputted to the memory 15 and selecting circuit 80 as a data B1. At this time, Huffman code or run-length code is utilized for variable length coding in the circuit 5. Data with higher appearing frequency is allotted with a code of a smaller number of bits, and data of less appearance is allotted with a code of a larger number of bits.

The variable-length-coded data B1 obtained during the time t0–t1 is inputted to the selecting circuit 60, where the number of bits of the data B1 is counted (S13). The optimum quantizing level C1 to record the data as much as possible in the recording area is selected by comparing the counted bit number H with the recordable bit number G (S14). The quantizing level C1 is the optimum level for coding the coefficient A1 outputted from the weighting circuit 3 during the time t0–t1. The quantizing level C1 is outputted to the adaptive quantizing circuit 7. More specifically, if the counted bit number H is larger than the recordable bit number G, the quantizing level for coarser quantization is selected. If H is equal to G, the same quantizing level is selected. In contract, when H is smaller than G, such quantizing level as to realize fine quantization is selected. The optimum quantizing level is selected from a plurality of quantizing levels, for example, as tabulated in FIG. 8, based on the ratio between the set number of bits and the recordable number of bits.

The variable-length-coded data B1 is once stored in the memory 15 and then decoded in the variable length decoding circuit 16. A coefficient D1 which is inputted during the time t0–t1 and decoded in the circuit 16 is quantized in the adaptive quantizing circuit 7 with the optimum quantizing level C1 selected in the circuit 60 (S15, S16 or S17). The data quantized to a predetermined number of bits in the circuit 7 is variable-length-coded in the variable length coding circuit 8 in the same coding method as in the circuit 5 (S18) and the obtained data E1 is outputted to the buffer memory 9. Thus, a variable length code is outputted from the buffer memory 9 at a fixed output rate (S19).

Subsequently, when the coefficient A2 is outputted from the weighting circuit 3 to the quantizing circuit 4 during the time t1–t2, an optimum quantizing level C2 is selected on the basis of the variable-length-coded data B2. A coefficient D2 decoded from the variable-length-coded data B2 is quantized with the quantizing level C2, thereby to obtain a variable-length-coded data E2. The above process is repeated every time a coefficient A3, A4, A5 ... is outputted from the weighting circuit 3, whereby the whole of the image data is variable-length-coded.

A memory is needed in the sixth embodiment alike. However, the memory 15 of the sixth embodiment stores the variable-length-coded data although the memory 14 of the third and fifth embodiments stores all the coefficients. Therefore, the number of bits to be stored in the memory can be rendered small enough and the capacity can be remarkably reduced according to the instant sixth embodiment.

[Seventh Embodiment]

Figure 17:
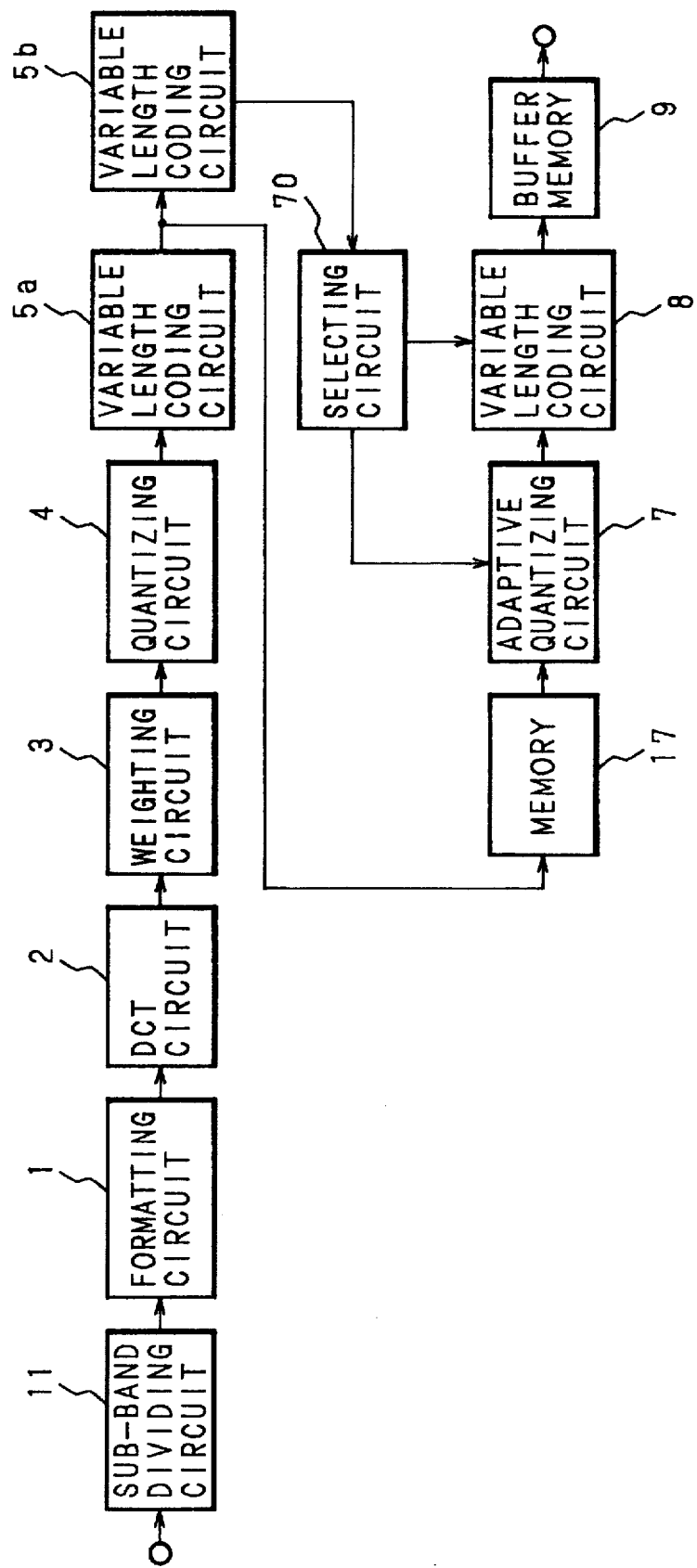
FIG. 17 is a structural block diagram of a coding apparatus according to a seventh embodiment of this invention.

A coding apparatus of a seventh embodiment will become clear from a structural block diagram indicated in FIG. 17. A formatting circuit 1, a DCT circuit 2, a weighting circuit 3, a quantizing circuit 4, an adaptive quantizing circuit 7, a variable length coding circuit 8, a buffer memory 9 and a sub-band dividing circuit 11 included in the coding apparatus are the same as shown in FIG. 11. According to the seventh embodiment, variable length coding is performed in two stages. Specifically, a variable length coding circuit 5a is connected to the quantizing circuit 4 so as to variable-length-code the coefficients outputted from the quantizing circuit 4 according to the run-length coding method, and the variable-length-coded data from the circuit 5a is outputted to a memory 17 and to another variable length coding circuit 5b which variable-length-codes the output from the circuit 5a according to the Huffman coding method. A selecting circuit 70 selects the optimum quantizing level on the basis of the number of bits of the variable length code obtained in the circuit 5b, and outputs the same to the adaptive quantizing circuit 7. At the same time, the selecting circuit 70 selects coefficients to be variable-length-coded in the circuit 8.

The operation of the coding apparatus will be discussed hereinbelow.

Figure 19:
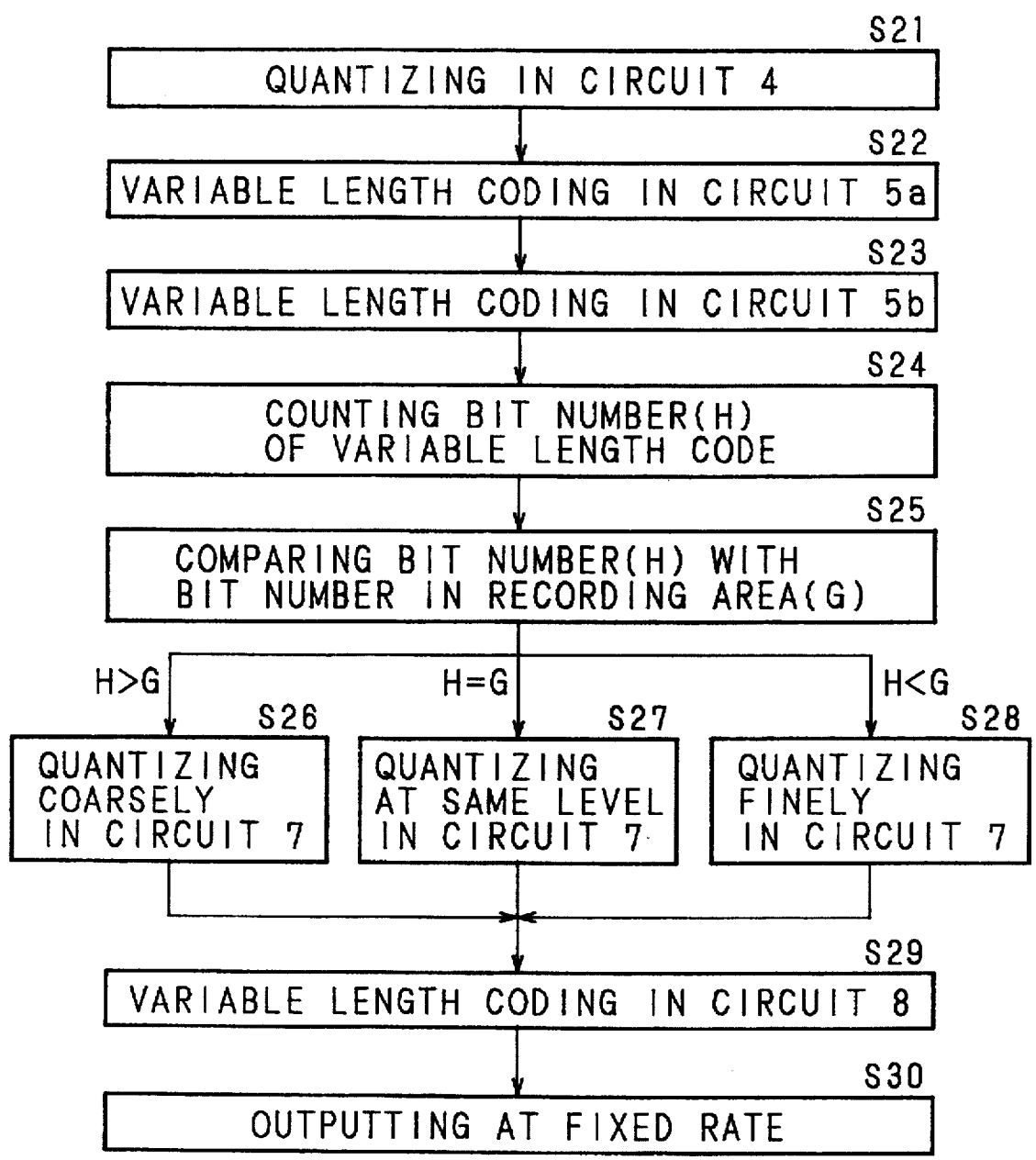
FIG. 19 is a flow chart of the coding apparatus of FIG. 17.

The operation from the sub-band dividing circuit 11 to the weighting circuit 3 will be omitted from the following description since the operation is carried out in the same manner as in the first embodiment. The following description with reference to a timing chart of FIG. 18 and a flow chart of FIG. 19 is related to the operation after the weighting circuit 3. In FIG. 18, sections defined by t0–t1, t1–t2, t2–t3 and t3–t4 are fixed blocks of the data to be recorded in a recording area. First, a coefficient A1 outputted from the weighting circuit 3 during a time t0–t1 is quantized in the quantizing circuit 4 (S21). The quantized data of a predetermined number of bits is variable-length-coded in the variable length coding circuit 5a (S22). Run-length code is used in the variable length coding circuit 5a. When the level of the sequentially fed data is zero, the data-is not supplied. However, when the level is not zero, the number of consecutive zeros and the level are sent out as indicated below:

Input data 0, 2, 0, 0, 0, 6, 3, 0, 0, 8, . . .

Output data (1, 2), (3, 6), (0, 3), (2, 8), . . .

The coded data B1 obtained in the variable length coding circuit 5a is outputted to the variable length coding circuit 5b and memory 17. The variable length coding circuit 5b uses Huffman code, whereby one code is assigned to the number of consecutive zeros and the level (S23). At this time, a code of a smaller number of bits is assigned to the data which appears frequently, while a code of a larger number of bits is assigned to the data which less appears.

The data B1 obtained through variable length coding during the time t0–t1 is inputted to the selecting circuit 70, and the number of bits of the data B1 is counted (S24). Then, the counted bit number H is compared with the recordable bit number G (S25), so that the optimum quantizing level C1 to record the data as much as possible in the recording area is selected. A quantizing level C1 is optimum to code the coefficient A1 outputted from the weighting circuit 3 during the time t0–t1. The quantizing level C1 is outputted to the adaptive quantizing circuit 7. If the counted bit number H is larger than the recordable bit number G, the quantizing level for coarse quantization is selected. When H is-equal to G, the same quantizing level is selected. Further, when H is smaller than G, the quantizing level for fine quantization is selected. For instance, the optimum quantizing level is selected from a plurality of quantizing levels, as shown in FIG. 8, based on the ratio between the set bit number and the recordable bit number.

The data B1 is temporarily stored in the memory 17 and outputted to the adaptive quantizing circuit 7 if it is necessary. The adaptive quantizing circuit 7 quantizes the coded data D1 stored in the memory 17 during the time t0–t1 with the optimum quantizing level C1 selected in the circuit 70 (S26, S27 or S28). The data after being quantized to a predetermined number of bits in the adaptive quantizing circuit 7 is variable-length-coded in the variable length coding circuit 8 in the same coding method as in the variable length coding circuit 5b (S29). The variable-length-coded data E1 is outputted to the buffer memory 9. As a result, a variable length code is outputted from the buffer memory 9 at a fixed output rate (S30).

Then, when a coefficient A2 is outputted from the weighting circuit to the quantizing circuit 4 during the time t1–t2, similar to the above, an optimum quantizing level C2 is selected by the selecting circuit 70 on the basis of the variable-length-coded data B2. The data D2 which is the output of the memory 17 storing the variable-length-coded data B2 is quantized with this quantizing level C2 to obtain a variable-length-coded data E2. The above-described sequence of procedures is carried out whenever a coefficient A3, A4, A5 . . . is outputted from the weighting circuit 3, so that the whole image data is variable-length-coded.

A memory is indispensable also in the present seventh embodiment. However, although the memory 14 of the third and fifth embodiments stores all of the coefficients, the memory 17 of the seventh embodiment stores only the variable-length-coded data. Therefore, the number of bits to be stored in the memory can be reduced much, with achieving a great elimination of the memory capacity.

In any of the foregoing embodiments, one block is constituted by 8 picture elements ×8 lines. However, the size of the block may be optionally set. Moreover, a first or a three dimensional block may be possible, in place of a two dimensional block.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A coding apparatus for reducing and coding digital image data to record the digital image data on a recording medium, comprising:

first quantizing means for quantizing input image data and outputting first quantized data;

first coding means for performing variable length coding on the first quantized data and outputting first coded data;

second coding means for performing variable length coding on the first coded data obtained by said first coding means using a coding method different from that of said first coding means thereby to obtain a variable length code;

selecting means for selecting a quantizing level based on a first coding amount obtained by said second coding means;

second quantizing means for quantizing the first coded data obtained with the quantizing level selected by said selecting means and obtaining second quantized data;

third coding means for performing variable length coding on the second quantized data, quantized by said second quantizing means; and storing means for storing the first coded data output by said first coding means prior to the first coded data being quantized by said second quantizing means, wherein said second quantizing means quantizes the first coded data stored by said storing means.

2. The coding apparatus of claim 1, wherein said selecting means selects the quantizing level so that a recording density in said recording medium is maximum.

3. The coding apparatus of claim 1, wherein said second quantizing means includes a plurality of quantizing tables of different quantizing step widths, and said selecting means selects one quantizing table from said plurality of quantizing tables based on a second coding amount obtained by said first coding means.

4. A coding apparatus comprising:
first coding means for receiving and coding a plurality of quantized coefficients, according to a first coding technique to produce first coded data; second coding means for receiving and coding the first coded data according to a second coding technique to produce a first amount of data;
selecting means for receiving the first amount of data and selecting a quantization level appropriate for the first amount of data;
third coding means for coding the first coded data according to the second coding technique using the quantization level from said selecting means to produce second coded data.

5. The coding apparatus of claim 4, wherein the first coding technique is a run-length coding technique and the second coding technique is a Huffman coding technique.

6. The coding apparatus of claim 4, further comprising a memory, for storing the first coded data prior to coding by said third coding means.

7. The coding apparatus of claim 4 further comprising a first quantizer, for receiving and quantizing a plurality of input coefficients and outputting the plurality of quantized coefficients to said first coding means.

8. The coding apparatus of claim 4, further comprising:
a buffer memory, for receiving and storing the second coded data and outputting the second coded data at a fixed rate.

9. The coding apparatus of claim 4, wherein said selecting means selects the quantization level to maximize a recording density of the second coded data on a recording medium.

* * * * *